(12) United States Patent
Chida

(10) Patent No.: US 11,318,376 B2
(45) Date of Patent: *May 3, 2022

(54) GAME PROCESSING PROGRAM, GAME PROCESSING METHOD, AND GAME PROCESSING DEVICE

(71) Applicant: GREE, INC., Tokyo (JP)

(72) Inventor: Makoto Chida, Tokyo (JP)

(73) Assignee: GREE, INC., Tokyo (JP)

( * ) Notice: Subject to any disclaimer, the term of this patent is extended or adjusted under 35 U.S.C. 154(b) by 34 days.

This patent is subject to a terminal disclaimer.

(21) Appl. No.: 16/887,671

(22) Filed: May 29, 2020

(65) Prior Publication Data

US 2020/0289921 A1 Sep. 17, 2020

Related U.S. Application Data

(63) Continuation of application No. 16/142,392, filed on Sep. 26, 2018, now Pat. No. 10,695,666.

(30) Foreign Application Priority Data

Sep. 29, 2017 (JP) .............................. JP2017-190640

(51) Int. Cl.
*A63F 9/24* (2006.01)
*A63F 11/00* (2006.01)
(Continued)

(52) U.S. Cl.
CPC ............ *A63F 13/25* (2014.09); *A63F 13/211* (2014.09); *A63F 13/213* (2014.09); *A63F 13/53* (2014.09);
(Continued)

(58) Field of Classification Search
USPC .......................... 463/1, 5, 20, 22, 30, 31, 39
See application file for complete search history.

(56) References Cited

U.S. PATENT DOCUMENTS

| 6,057,856 A | 5/2000 | Miyashita et al. |
| 2008/0026838 A1 | 1/2008 | Dunstan |

(Continued)

FOREIGN PATENT DOCUMENTS

| EP | 2 921 938 A1 | 9/2015 |
| JP | 10-154243 | 6/1998 |

(Continued)

OTHER PUBLICATIONS

Extended European Search Report dated Dec. 14, 2018 in Patent Application No. 18196986.6, 7 pages.

(Continued)

*Primary Examiner* — Adetokunbo O Torimiro
(74) *Attorney, Agent, or Firm* — Oblon, McClelland, Maier & Neustadt, L.L.P.

(57) ABSTRACT

A game processing device controls a first mounted display worn by a first player to display a virtual space in association with a first virtual position in the virtual space, and controls a second mounted display worn by a second player to display the virtual space in association with a second virtual position in the virtual space. The device also determines a position of the first player in a real space based on an output of a first sensor, moves the first virtual position in accordance with the position of the first player, determines a position of the second player in the real space based on an output of a second sensor, and moves the second virtual position in accordance with the position of the second player. The device produces a game special effect when a distance between the first and second virtual positions is within a predetermined range.

14 Claims, 10 Drawing Sheets

(51) Int. Cl.
  *G06F 13/00*    (2006.01)
  *G06F 17/00*    (2019.01)
  *A63F 13/25*    (2014.01)
  *A63F 13/211*   (2014.01)
  *A63F 13/213*   (2014.01)
  *A63F 13/53*    (2014.01)
  *G02B 27/01*    (2006.01)
  *A63F 13/655*   (2014.01)
  *G02B 27/00*    (2006.01)
  *A63F 13/86*    (2014.01)
  *G06T 19/00*    (2011.01)
  *H04L 67/131*   (2022.01)

(52) U.S. Cl.
  CPC ............ *A63F 13/655* (2014.09); *A63F 13/86* (2014.09); *G02B 27/00* (2013.01); *G02B 27/01* (2013.01); *G02B 27/017* (2013.01); *G06T 19/003* (2013.01); *H04L 67/38* (2013.01); *A63F 2300/8082* (2013.01); *G02B 2027/014* (2013.01); *G02B 2027/0187* (2013.01); *G06T 2219/024* (2013.01)

(56) References Cited

U.S. PATENT DOCUMENTS

| | | |
|---|---|---|
| 2015/0094142 A1 | 4/2015 | Stafford |
| 2015/0269780 A1 | 9/2015 | Herman et al. |
| 2016/0214016 A1 | 7/2016 | Stafford |
| 2017/0203213 A1 | 7/2017 | Stafford |
| 2018/0093184 A1 | 4/2018 | Stafford |

FOREIGN PATENT DOCUMENTS

| | | |
|---|---|---|
| JP | 2000-126451 A | 5/2000 |
| JP | 2017-55993 A  | 3/2017 |

OTHER PUBLICATIONS

European Office Action dated Oct. 25, 2021 in European Patent Application No. 18 196 986.6, 9 pages.

Combined Chinese Office Action and Search Report dated Sep. 9, 2021 in Patent Application No. 201811115099.4 (with English language translation), 15 pages.

Notice of Reasons for Refusal dated Sep. 28, 2021 in Japanese Patent Application No. 2017-190640 (with English machine translation), 6 pages.

| Player ID | Health Value | Obtained Score | Task Accomplishment Information |
|---|---|---|---|
| *** | *** | *** | *** |
| *** | *** | *** | *** |

GAME PROCESSING PROGRAM, GAME PROCESSING METHOD, AND GAME PROCESSING DEVICE

CROSS-REFERENCE TO RELATED APPLICATIONS

This application is a continuation of U.S. application Ser. No. 16/142,392, filed Sep. 26, 2018, and is based upon and claims the benefit of priority under 35 U.S.C. 119 to Japanese Application No. 2017-190640 filed Sep. 29, 2017, the entire contents of each of which are incorporated herein by reference.

BACKGROUND

The present disclosure relates to a game processing program, a game processing method, and a game processing device for processing a game in which multiple players share a virtual space.

In conventional virtual reality games (hereinafter referred to as VR games), a mounted display wearable on the head of the player (hereinafter referred to as head-mounted display (HMD)) is used. The HMD includes a tracking sensor such as a gyro sensor and can detect motion of the head of the player based on an output of the tracking sensor. The HMD includes a display that displays an image of the virtual space in a viewpoint that changes in accordance with the detected motion of the head. This allows the player to play the game as if the player exists in the virtual space.

In the technical field of presenting the user with the virtual space, sharing of a single virtual space between multiple users has also been proposed. Japanese Laid-Open Patent Publication No. 10-154243 describes an example of a system in which an avatar corresponding to each user is arranged in a single virtual space and the users share the single virtual space through their client terminals connected to the internet.

The virtual space of a VR game using an HMD is shared when, for example, each player wearing the HMD participates in the same game. When the cooperation of the players in the virtual space is reflected on the accomplishment of an objective of each player in the game, the ingenuity of the game increases as compared to a VR game played by a single player. This enables the user to be highly interested in the game and consequently increases the number of users who participate in the game.

SUMMARY

It is an object of the present disclosure to provide a game processing program, a game processing method, and a game processing device that, in a virtual reality game played by multiple players wearing displays, allow multiple players to cooperate in playing the game.

To achieve the above object, one aspect of the present disclosure provides a non-transitory computer-readable medium that stores a program that processes a game. The program, when executed by circuitry, causes the circuitry to control a first mounted display worn by a first player to display a virtual space in association with a first virtual position in the virtual space, control a second mounted display worn by a second player to display the virtual space in association with a second virtual position in the virtual space, determine a position of the first player in a real space based on an output of a first sensor, move the first virtual position in accordance with the position of the first player, determine a position of the second player in the real space based on an output of a second sensor, move the second virtual position in accordance with the position of the second player, and when a condition is satisfied, produce a special effect in the game. The condition includes a condition in which a distance between the first virtual position and the second virtual position is within a predetermined range.

Another aspect provides a method for processing a game. The method includes controlling, by circuitry, a first mounted display worn by a first player to display a virtual space in association with a first virtual position in the virtual space, controlling, by the circuitry, a second mounted display worn by a second player to display the virtual space in association with a second virtual position in the virtual space, determining, by the circuitry, a position of the first player in a real space based on an output of a first sensor, moving, by the circuitry, the first virtual position in accordance with the position of the first player, determining, by the circuitry, a position of the second player in the real space based on an output of a second sensor, moving, by the circuitry, the second virtual position in accordance with the position of the second player, and when a condition is satisfied, producing, by the circuitry, a special effect in the game. The condition includes a condition in which a distance between the first virtual position and the second virtual position is within a predetermined range.

A further aspect provides a device for processing a game. The device includes circuitry. The circuitry is configured to control a first mounted display worn by a first player to display a virtual space in association with a first virtual position in the virtual space, control a second mounted display worn by a second player to display the virtual space in association with a second virtual position in the virtual space, determine a position of the first player in a real space based on an output of a first sensor, move the first virtual position in accordance with the position of the first player, determine a position of the second player in the real space based on an output of a second sensor, move the second virtual position in accordance with the position of the second player, and when a condition is satisfied, produce a special effect in the game. The condition includes a condition in which a distance between the first virtual position and the second virtual position is within a predetermined range.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure, together with objects and advantages thereof, may best be understood by reference to the following description of the presently preferred embodiments together with the accompanying drawings in which.

DETAILED DESCRIPTION

A game processing program, a game processing method, and a game processing device according to exemplary aspects of the present disclosure will now be described with reference to FIGS. 1 to 18.

[Overall Configuration of Game System]

Figure 1:
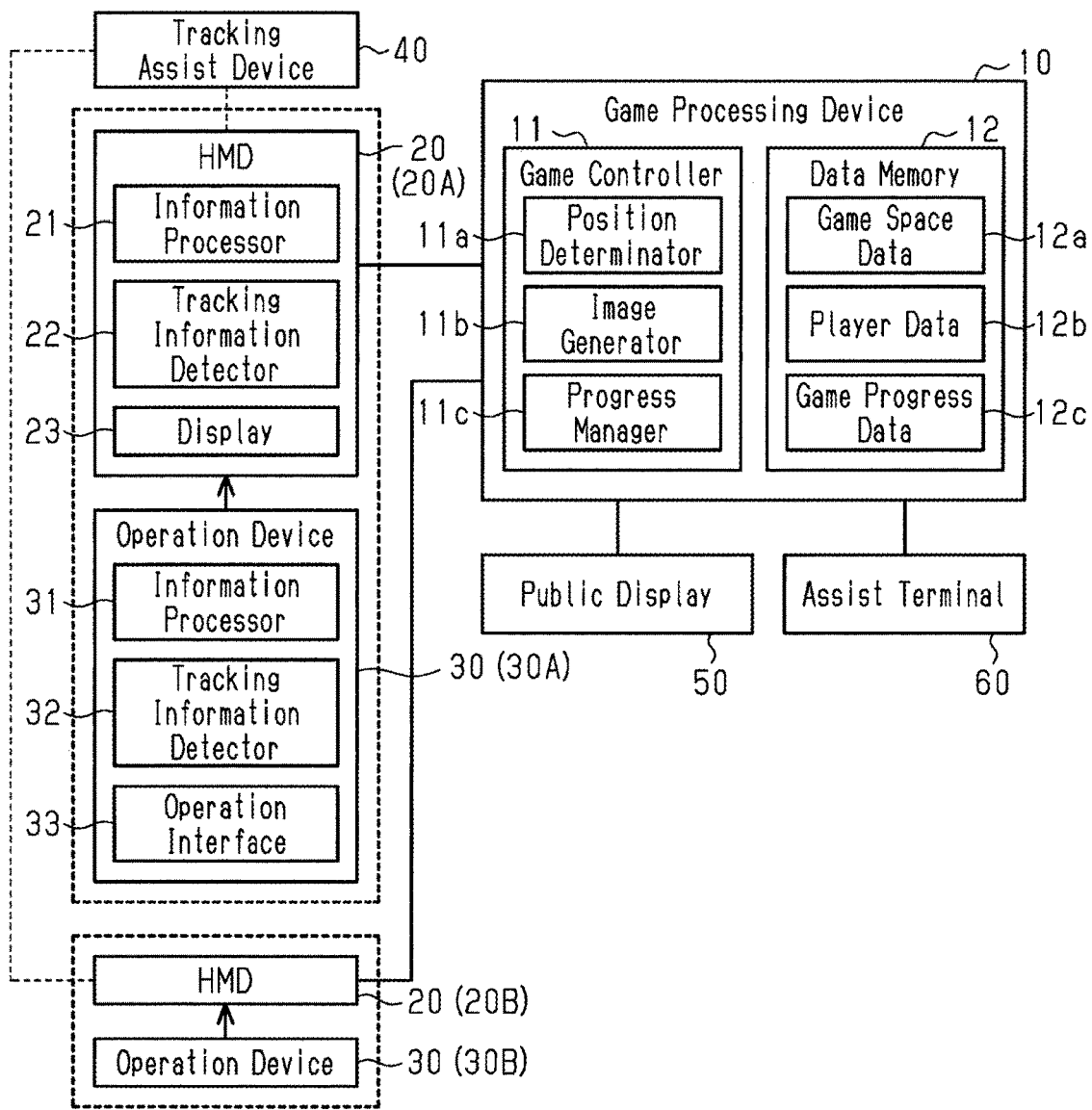
FIG. 1 is a functional block diagram illustrating the devices of a system that executes a game processing method according to exemplary aspects of the present disclosure.

The overall configuration of a game system using an exemplary game processing method of the present disclosure will now be described with reference to FIG. 1. As shown in FIG. 1, the game system includes a game processing device 10, a head-mounted display (hereinafter referred to as HMD) 20 serving as a mounted display, an operation device 30, and a tracking assist device 40. Further, the game system includes a public display 50 and an assist terminal 60.

The game processing device 10 and the HMD 20 communicate with each other in a wired or wireless manner. The player wears the HMD 20 on his or her head to operate the operation device 30. The game processing device 10 controls the HMD 20 so as to display a virtual space in a viewpoint corresponding to the direction and orientation of the HMD 20 and manages the progress of the game in the virtual space based on the information detected with the HMD 20 and the operation device 30.

One HMD 20 is associated with one operation device 30. The game system includes multiple sets of HMDs 20 and operation devices 30. An HMD 20 and an operation device 30 associated with the HMD 20 are used by the same player. In the present embodiment, the game system includes an HMD 20A and an operation device 30A, which are used by a first player, and an HMD 20B and an operation device 30B, which are used by a second player. The HMD 20A is one example of a first mounted display, and the operation device 30A is one example of a first operation device. The HMD 20B is one example of a second mounted display, and the operation device 30B is one example of a second operation device.

The HMD 20 includes an information processor 21, a tracking information detector 22, and a display 23. The information processor 21 includes, for example, a processor, a memory, and a communication interface. The information processor 21 outputs, to the game processing device 10, a signal corresponding to a detection result of the tracking information detector 22. Further, the information processor 21 receives an input of a signal representing image information or the like from the game processing device 10 to control the display 23 so as to display an image of the virtual space based on the input signal.

The tracking information detector 22 includes a device for calculating the position and orientation of the HMD 20, i.e., the position and orientation of the head of the player. For example, the tracking information detector 22 includes a sensor that detects information used mainly to calculate the orientation of the HMD 20. Such a sensor includes, for example, at least one of a gyro sensor, an acceleration sensor, and a geomagnetic sensor. These sensors can also be used to calculate the position of the HMD 20. Further, in addition to or instead of the above sensors, the tracking information detector 22 may include a sensor that directly detects the eye motion of the player, for example, a sightline detection sensor that emits near-infrared light to an iris and detects its reflected light.

Additionally, the tracking information detector 22 includes, for example, a position detection device that detects information used mainly to calculate the position of the HMD 20. More specifically, the position detection device can detect information used to calculate the position of the HMD 20 by cooperating with the tracking assist device 40, which is arranged separately from the HMD 20 in a real space where the player is located. The position detection device and the tracking assist device 40 may also be used to calculate the orientation of the HMD 20 in addition to the position of the HMD 20. For example, one of the position detection device and the tracking assist device 40 is a light-emitting device such as a laser device or LED that emits infrared light or visible light, and the other one is a light-receiving device such as a camera that receives light corresponding to the light-emitting device. The position and orientation of the HMD 20 are calculated based on the information obtained by using the light-emitting device and the light-receiving device. Such information includes, for example, from which one of multiple light-emitting devices arranged in a predetermined manner the light-receiving device receives light, which one of multiple light-receiving devices arranged in a predetermined manner receives light from the light-emitting device, the direction in which light is emitted from the light-emitting device, and the time for the light emitted from the light-emitting device to reach the light-receiving device. When the tracking assist device 40 is a light-receiving device or when the tracking assist device 40 is a light-emitting device and the light emission is controlled by the game processing device 10, the tracking assist device 40 simply needs to be capable of communicating directly with the game processing device 10 or via the HMD 20.

Instead of using the tracking assist device 40 arranged outside the HMD 20, only a detection result of the tracking information detector 22 of the HMD 20 may be used to be capable of calculating the position and orientation of the HMD 20. The position of the HMD 20 calculated from the detection result of the tracking information detector 22 may be a relative position with respect to the initial position of the HMD 20 or an absolute position in a real space, i.e., in a three-dimensional space having a predetermined size where the player playing the game is located.

The display 23 displays an image based on a signal from the information processor 21. The display 23 includes, for example, one or more display panels. In accordance with the layout of the display panel, the display 23 displays an image in which the influence of parallax or the like is taken into account. The display 23 may be a retinal projection display system.

The operation device 30 is configured to communicate with the HMD 20 associated with the operation device 30 in a wired or wireless manner. The player carries the operation device by having the operation device 30 with the hand or by wearing the operation device 30 on the hand or arm.

The operation device 30 includes an information processor 31, a tracking information detector 32, and an operation interface 33. The information processor 31 may include, for example, a processor, a memory, and a communication interface, or any other circuit that can perform processing such as a field programmable gate array (FPGA), discrete logic circuits, and the like. The information processor 31 outputs, to the HMD 20, a signal corresponding to a detection result of the tracking information detector 32 and a signal corresponding to operation performed on the operation interface 33. The HMD 20 outputs, to the game processing device 10, a signal corresponding to the signal input from the operation device 30.

The tracking information detector 32 includes a device that detects information used to calculate the position and orientation of the operation device 30. The position of the operation device 30 corresponds to the position of the hand of the player. The tracking information detector 32 includes, for example, at least one of a gyro sensor, an acceleration sensor, and a geomagnetic sensor. Additionally, the tracking information detector 32 may include a device that can detect the information used to calculate the position and orientation of the operation device 30 by cooperating with the tracking assist device 40.

The position of the operation device 30 calculated from the detection result of the tracking information detector 32 may be a relative position with respect to the initial position of the operation device 30, a relative position with respect to the position of the HMD 20 associated with the operation device 30, or an absolute position in the real space.

The operation interface 33 includes, for example, a button or lever pushed by the player to be operated and is configured to be operable without being visually recognized by the player.

The operation device 30 may communicate with the game processing device 10 directly, not via the HMD 20, and output, to the game processing device 10, a signal corresponding to the detection result of the tracking information detector 22 and a signal corresponding to operation performed on the operation interface 33. In this case, the association of the HMD 20 with the operation device 30 simply needs to be managed by, for example, storing the association of identification information of the HMD 20 with identification information of the operation device 30 in the game processing device 10.

The public display 50 is a display viewed by users other than the player participating in the game, i.e., users who are not wearing the HMD 20 such as users waiting for the order of participating in the game and users watching the game in the surroundings. The public display 50 is, for example, a large display arranged near the region of the real space where the player participating in the game is located. The public display 50 communicates with the game processing device 10 in a wired or wireless manner, receives an input of image information from the game processing device 10, and displays an image of the virtual space based on the image information.

The assist terminal 60 is a terminal having a photographing function and a displaying function and communicating with the game processing device 10 in a wired or wireless manner. For example, the assist terminal 60 is embodied in a tablet terminal. The assist terminal 60 is used to provide the player with information and to perform setting necessary for the player to participate in the game before and after playing the game. More specifically, the assist terminal 60 is used to set an avatar for each player.

The game processing device 10 includes a game controller 11 and a data memory 12.

The game controller 11 includes circuitry that functions as a position determinator 11a, an image generator 11b, and a progress manager 11c by executing the game processing program recorded in a non-volatile memory of the game processing device 10.

The position determinator 11a determines the position and orientation of the HMD 20 based on a signal input from the HMD 20, i.e., based on the information detected by the tracking information detector 22 of the HMD 20. Further, the position determinator 11a determines the position and orientation of the operation device 30 based on a signal input from the operation device 30 via the HMD 20, i.e., based on the information detected by the tracking information detector 32 of the operation device 30. In order to perform calculation for determination of position and orientation, a known algorithm corresponding to the information detected with the HMD 20 and the operation device 30 simply needs to be used.

The image generator 11b extracts information of the virtual space and generates image information from the extracted information. For example, the image generator 11b generates image information of the virtual space in a viewpoint corresponding to the position and orientation of the HMD 20 and outputs the image information to the HMD 20. The determination of position and orientation by the position determinator 11a and the generation and outputting of the image information by the image generator 11b are performed for each HMD 20. In addition, for example, the image generator 11b generates image information in which the virtual space is overlooked from a predetermined overlooking point and outputs the image information to the public display 50.

In addition, using the information input from the assist terminal 60, the image generator 11b generates information used to form an avatar for each player.

The progress manager 11c updates the positions of various objects in the virtual space to control the appearance positions, appearance timing, and movement of the objects and define the configuration of the virtual space in which information is extracted by the image generator 11b. Further, the progress manager 11c determines the progress state of the game based on the operation of the player, i.e., the information detected with the HMD 20 and the operation device 30 and the information stored in the data memory 12, to reflect the progress state on the configuration of the virtual space and record the progress state in the data memory 12.

The data memory 12 stores data used to render the virtual space and manage the progress of the game. The data memory 12 stores game space data 12a, player data 12b, and game progress data 12c.

The game space data 12a is used to render a space where the game is played and includes data used to render the background of the game field and data used to render an object arranged in the game field. The display of the object is controlled based on a predetermined condition. Such an object includes, for example, an object such as an enemy moving in the game field and an object displayed only when the predetermined condition is satisfied. The game space data 12a includes position information of such an object in the virtual space.

The player data 12b is used to render an object arranged in the virtual space in accordance with the position and orientation of each of the HMD 20 and the operation device 30. Such an object includes an avatar set for each player and a weapon possessed by the player. The player data 12b includes position information of the avatar and the weapon in the virtual space.

The game progress data 12c is used to manage the progress of the game and updated as the game progresses. The game progress data 12c includes information related to an enemy that appears in the game and information related to the player. The enemy-related information includes, for example, information indicating the difficulty for the player to defeat the enemy such as the health value or the like of the enemy. The player-related information includes, for example, information indicating the degree of accomplishment of the game, such as scores obtained when the player defeats the enemy, and information indicating the satisfaction state of the condition necessary for the came to progress.

[Preliminary Setting]

With reference to FIGS. 2 to 6, various types of setting performed before the game starts will now be described together with the configurations of the real space, the virtual space, and the image of the virtual space displayed on the HMD 20 and the public display 50. In the present disclosure, the game implemented by the game system is a game in which the player shoots a target object indicating an enemy moving in the virtual space by operating the operation device 30.

Figure 2:
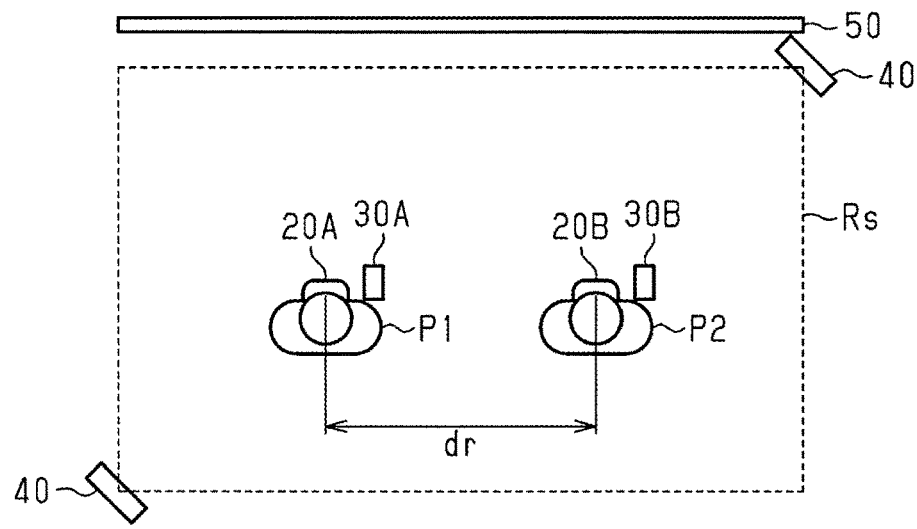
FIG. 2 is a diagram illustrating an example of the layout of the devices of the system of FIG. 1 in a real space according to exemplary aspects of the present disclosure.

FIG. 2 shows the layout of the devices of the game system and the players in the real space.

In the real space, a play space Rs, where the players perform operation, is set within a range in which the positions and orientations of the HMDs 20 can be detected with the HMDs 20 and the tracking assist device 40. A first player P1, who uses the HMD 20A and the operation device 30A, and a second player P2, who uses the HMD 20B and the operation device 30B, are located in the play space Rs while participating in the game. The horizontal distance between the first player P1 and the second player P2 in the play space Rs, i.e., the distance between the HMD 20A and the HMD 20B when projected on a horizontal plane in the real space, is a real distance dr.

The position of the public display 50 is not particularly limited and is arranged, for example, in a region adjacent to or in the play space Rs. The public display 50 is, for example, arranged in front of the first player P1 and the second player P2. In the play space Rs illustrated in FIG. 2, the direction toward the public display 50 in parallel to the horizontal direction is referred to as the front direction and the vertical direction is referred to as the up-down direction to define three directions, namely, front-rear direction, left-right direction, and up-down direction. The first player P1 and the second player P2 are located next to each other in the left-right direction to start the game. Users other than the first player P1 and the second player P2 look at the public display 50 from the rear or side of the first player P1 and the second player P2.

The position of the HMD 20 when the game processing device 10 starts determining the position and orientation of the HMD 20 or when the came is started is a reference position of the HMD 20 in the play space Rs. The position of the HMD 20 changes from the reference position depending on the operation of the player. The reference position of the HMD 20A is a first reference position, and the reference position of the HMD 20B is a second reference position.

The tracking assist device 40 is arranged, for example, above the play space Rs.

Figure 3:
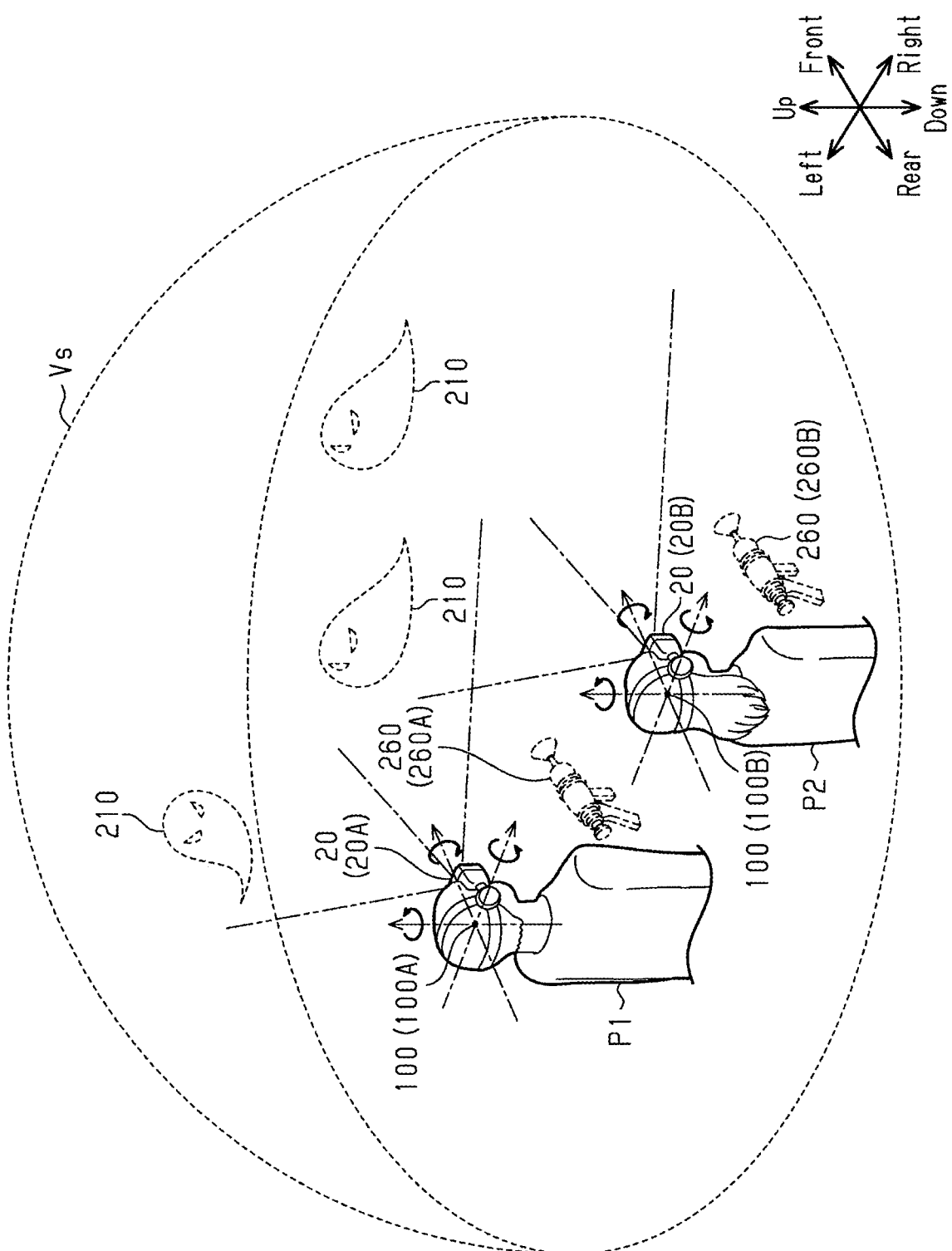
FIG. 3 is a schematic diagram illustrating a virtual space and an image viewed by the player in the system of FIG. 1 according to exemplary aspects of the present disclosure.

The virtual space and the image displayed on the HMD 20 will now be described with reference to FIG. 3.

The position determinator 11a of the game processing device 10 determines the position and orientation of the HMD 20 based on a signal input from the HMD 20. More specifically, the position determinator 11a calculates the position and orientation of the HMD 20 as the position in a three-dimensional orthogonal coordinate system and the angle about each of the three axes. Further, the position determinator 11a calculates the position and orientation of the operation device 30 based on a signal input from the operation device 30 via the HMD 20 as the position in the three-dimensional orthogonal coordinate system and the angle about each of the three axes. For example, the positions and orientations of the HMD 20 and the operation device 30 may be calculated using the front-rear axis as a "roll axis," the up-down axis as a "yaw axis," and the left-right axis as a "pitch axis" and using the angle about each of the three axes as a roll angle, a yaw angle, and a pitch angle.

The position determinator 11a arranges a virtual point 100 in the virtual space Vs by aligning the axial direction of a coordinate system that defines the position (virtual position) and orientation in the virtual space Vs and the axial direction of a coordinate system that defines the position and orientation in the play space Rs so that the front-rear direction, the left-right direction, and the up-down direction in the virtual space Vs respectively match the front-rear direction, the left-right direction, and the up-down direction in the play space Rs. The virtual point 100 moves from the initial position as the position of the HMD 20 moves, and the position of the virtual point 100 corresponds to the position of the player in the virtual space Vs. For example, the position of the virtual point 100 is where the head of the avatar associated with the player is arranged. The virtual point 100 corresponding to the HMD 20A is a first virtual point 100A, and the virtual point 100 corresponding to the HMD 20B is a second virtual point 100B.

For example, in the initial position, the position of the virtual point 100 in the up-down direction may be set in accordance with the position of the HMD 20 in the up-down direction at the reference position in the play space Rs. The position of the virtual point 100 in the front-rear direction and the left-right direction may be set to a position set in advance regardless of the position of the HMD 20 in the front-rear direction and the left-right direction at the reference position in the play space Rs. When the HMD 20 moves from the reference position, the position determinator 11a moves the virtual point 100 from the reference position by reflecting the amount of movement from the reference position with respect to each of the front-rear direction, the left-right direction, and the up-down direction on the amount of movement from the initial position with respect to each of the front-rear direction, the left-right direction, and the up-down direction.

The image generator lib generates image information based on the position and orientation of the HMD 20 and outputs the generated image information to the HMD 20. For example, taking into account the position of the eyes of the player that is estimated based on the position and orientation of the HID 20, the sightline direction and a gaze position, which is the leading end of the sightline direction, are calculated. Then, the image information of a predetermined range set by the angle of view or the like around the gaze position is generated. For generation of the image information, the data stored in the data memory 12 is used.

The progress manager 11c defines the configuration of the virtual space Vs by updating the position of an object in the virtual space Vs. For example, the progress manager 11c causes a target object 210, which represents an enemy, to appear and causes the target object 210 to move in a manner defined by the game processing program. In addition, for example, the progress manager 11c arranges the avatar associated with the player in the virtual space Vs based on the position and orientation of the HMD 20 and arranges a weapon 260, which resembles a gun or the like, in the virtual space Vs based on the position and orientation of the operation device 30.

Thus, the position determinator 11a, the image generator 11b, and the progress manager 11c repeat the processes described above so that the image information of the display range corresponding to the position and orientation of the HMD 20 at the moment is output to the HMD 20 in the virtual space Vs at the moment defined by the progress manager 11c. This allows the players to look at, via the HMD 20, the image of the virtual space Vs at the moment viewed from the viewpoints corresponding to the positions of the players in the virtual space Vs.

In the same virtual space defined by the progress manager 11c, for each HMD 20, determination of the position and orientation of the HMD 20 and generation and outputting of the corresponding image information are performed. In the process for the HMD 20A and the process for the HMD 20B, the axial directions of the coordinate system in the play space Rs and the axial directions of the coordinate system in the virtual space Vs are both shared.

Accordingly, the HMD 20A and the HMD 20B display the image of the same virtual space Vs viewed from the viewpoint corresponding to the position and orientation of each HMD 20. In addition, the orientation relationship of the HMD 20A and the HMD 20B in the play space Rs is reflected on the viewpoint of the image displayed on each HMD 20. For example, when the first player P1 and the second player P2 are oriented in the same direction in the play space Rs, the first player P1 and the second player P2 see the images from different viewpoints oriented in the same direction in the virtual space Vs via the HMDs 20.

When the position of the avatar corresponding to the second player P2 is included in the display range of the image displayed on the HMD 20A, which is worn by the first player P1, the HMD 20A does not have to display the avatar of the first player P1 while displaying the avatar of the second player P2 even if the position of the avatar corresponding to the first player P1 is included in the display range. In this case, when the position of the weapon 260A corresponding to the operation device 30A is included in the display range, the HMD 20A displays only the weapon 260A, for example, floating in the air in accordance with the position and orientation of the operation device 30A.

Such a configuration prevents the first player P1 from viewing the avatar moving differently from small movement of the hands and legs of the first player P1 in the play space Rs as the avatar corresponding to the first player P1. Thus, the first player P1 feels less uncomfortable. The image displayed on the HMD 20A is viewed from the position of the avatar of the first player P1 in the virtual space Vs. This makes the player P1 less uncomfortable even if the avatar of the first player P1 is not displayed. In the same manner, the HMD 20B, which is worn by the second player P2, does not have to display the avatar corresponding to the second player P2 while displaying the avatar corresponding to the first player P1 in accordance with the position and orientation.

Figure 4:
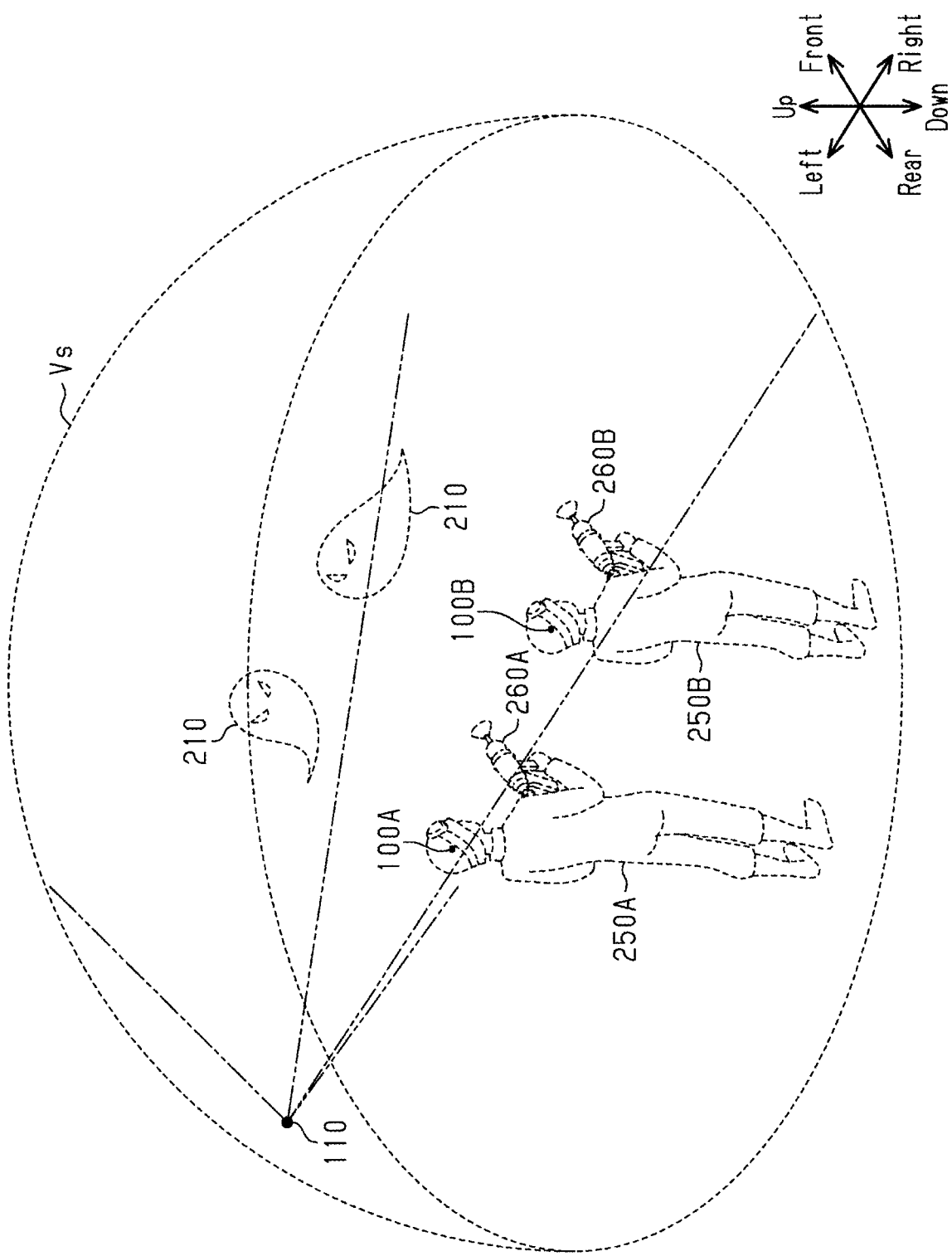
FIG. 4 is a schematic diagram illustrating an image of the virtual space displayed on a public display in the system of FIG. 1 according to exemplary aspects of the present disclosure.

The image displayed on the public display 50 will now be described with reference to FIG. 4.

The image generator 11b of the game processing device 10 generates image information of the display range in the sightline direction overlooking the virtual space Vs from an overlooking point 110, which is a fixed point set in the virtual space Vs, and outputs the generated image information to the public display 50. The overlooking point 110 is set to, for example, a position located at the middle between the initial position of the first virtual point 100A and the initial position of the second virtual point 100B in the left-right direction, located rearward from the initial positions of the virtual points 100A and 100B in the front-rear direction, and located above the initial positions of the virtual points 100A and 100B in the up-down direction. When the game starts, the display range of the image output to the public display 50 may include the upper body or the whole body of an avatar 250A, which corresponds to the first player, and the upper body or the whole body of the an avatar 250B, which corresponds to the second player.

Thus, the public display 50 displays the image in which the virtual space Vs is viewed from a viewpoint located above and behind the first player and the second player in the virtual space Vs. This allows the user looking at the public display 50 to watch the game as if viewing the first player and the second player playing the game from above and behind the first player and the second player in the virtual space Vs.

[Setting of Initial Position]

The setting of the virtual point 100 is performed for each of the HMD 20A and the HMD 20B. The positional relationship of the first virtual point 100A corresponding to the HMD 20A and the second virtual point 100B corresponding to the HMD 20B will now be described with reference to FIG. 5.

As described above, with respect to the position in the front-rear direction and the left-right direction, i.e., with respect to the position projected on the horizontal plane, the initial position of the first virtual point 100A is set regardless of the first reference position serving as the reference position of the HMD 20A, and the initial position of the second virtual point 100B is set regardless of the second reference position serving as the reference position of the HMD 20B.

The initial positions of the first virtual point 100A and the second virtual point 100B projected on the horizontal plane, i.e., the positional coordinates of the initial position of the virtual point 100 on the horizontal plane, are also set when implementing the game system in a certain place of the real space and setting the play space Rs. Subsequently, the set position coordinates may be maintained, and the position coordinates may be set for each gameplay before the game starts.

Figure 5:
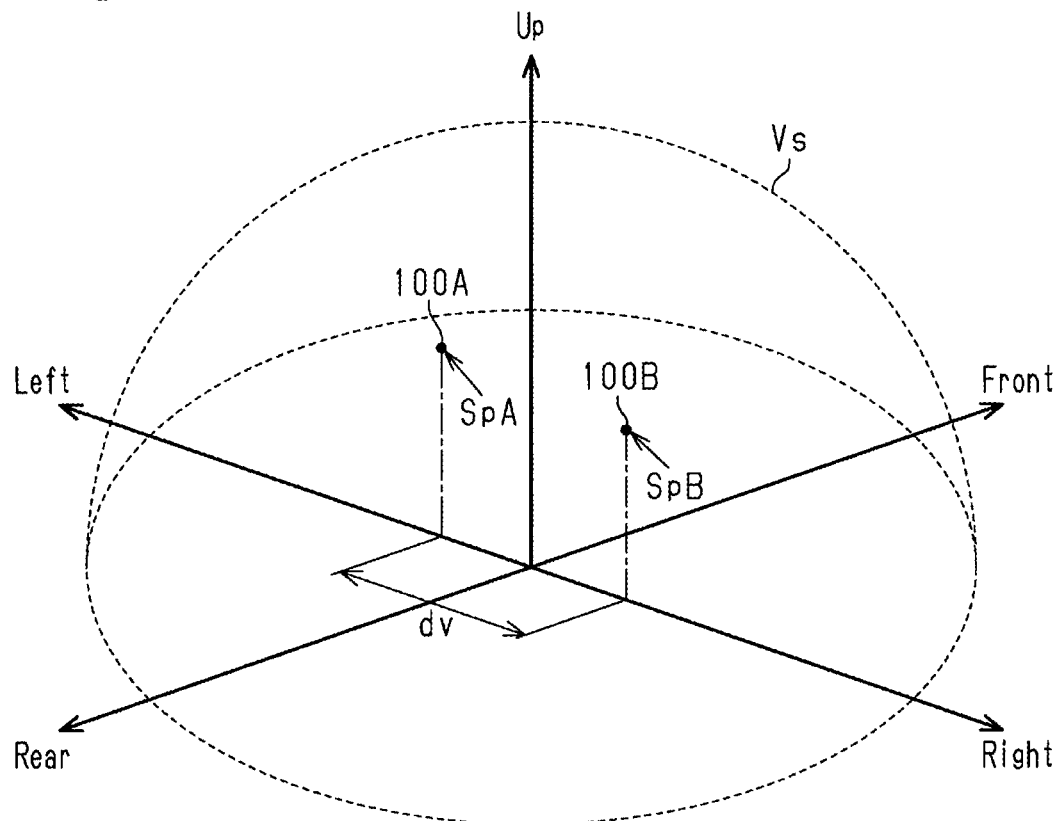
FIG. 5 is a diagram illustrating an example of setting of an initial position of a virtual point in the virtual space of FIG. 3 according to exemplary aspects of the present disclosure.

As shown in FIG. 5, more specifically, when projected on the horizontal plane, the initial position SpA of the first virtual point 100A and the initial position SpB of the second virtual point 100E are set in the left-right direction so as to be spaced apart from each other by an initial distance, which is a predetermined distance. The initial distance is an initial value of a virtual distance dv, which is a horizontal distance between the first virtual point 100A and the second virtual point 100B. The horizontal direction extends along the horizontal plane, which is a virtual plane parallel to the left-right direction and the front-rear direction. The virtual point 100 is set and the players are arranged so that the arrangement order of the first virtual point 100A and the second virtual point 100B in the left-right direction corresponds to the arrangement order of the first player and the second player when the game starts in the play space Rs, i.e., the arrangement order of the HMD 20A and the HID 20B.

For example, in the play space Rs, the positions where the first player and the second player are expected to stand when the game starts are set. Further, the position coordinates of the initial position SpA of the first virtual point 100A and the initial position SpB of the second virtual point 100B on the horizontal plane are set such that the distance between the first player and the second player differs from the initial distance.

As one example, in a case in which the initial distance is set to be smaller than the distance between the expected positions of the first player and the second player when the game starts, the virtual distance dv is smaller than the real distance dr between the HMD 20A and the HMD 20B when the game starts. When such a configuration is applied to a game in which the first player and the second player attempt to operate to move toward each other, the first player and the second player perceive the distance therebetween in the virtual space Vs to be shorter than the distance therebetween in the play space Rs. This prevents the first player and the second player from moving toward each other more than necessary in the play space Rs. As a result, even if the first player and the second player cannot see each other in the play space Rs because they wear the HMDs 20, the first player and the second player are prevented from inadvertently contacting with each other in the play space Rs.

As another example, in a case in which the initial distance is set to be larger than the distance between the expected positions of the first player and the second player when the game starts, the virtual distance dv is larger than the real distance dr between the HMD 20A and the HMD 20B when the game starts. When such a configuration is applied to a game in which the first player and the second player attempt to operate to move away from each other, the first player and the second player perceive the distance therebetween in the virtual space Vs to be longer than the distance therebetween in the play space Rs. This prevents the first player and the second player from moving away from each other more than necessary in the play space Rs. As a result, in the real space, the first player and the second player are prevented from moving out of the play space Rs.

In the present embodiment, the initial position SpA of the first virtual point 100A and the initial position SpB of the second virtual point 100B are set such that the initial distance is smaller than the distance between the expected positions of the first player and the second player when the game starts. That is, the virtual distance dv is shorter than the real distance dr when the game starts. The initial position of the virtual point 100 in the front-rear direction may be set based on the reference position of the HMD. In this case, the same advantage as above is obtained.

[Setting of Avatar]

The process for setting the avatar will now be described with reference to FIG. 6. In the present embodiment, an avatar is generated for each player based on the face image of the player. The process for setting the avatar is performed before the game starts.

Figure 6:
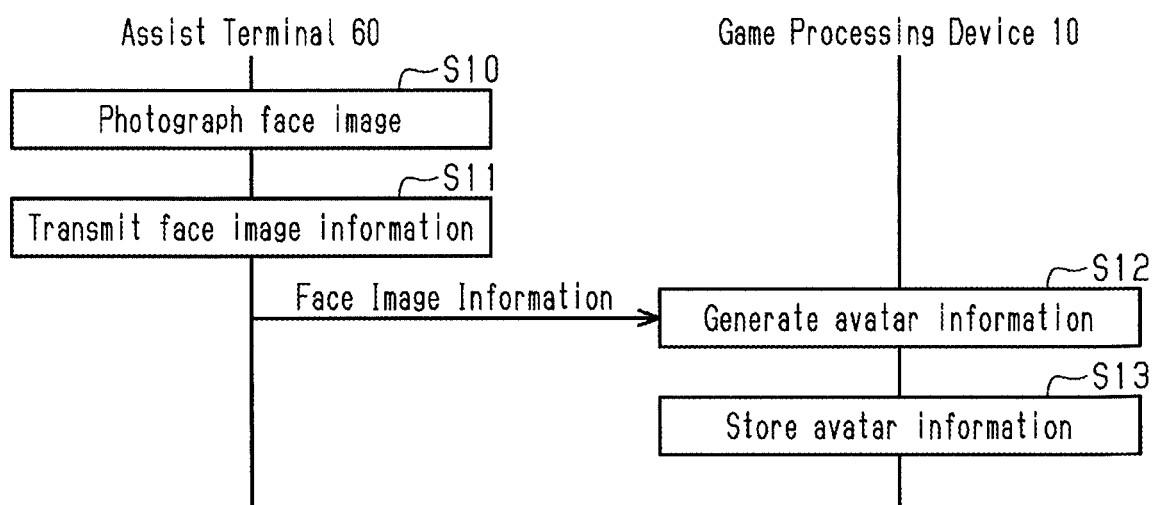
FIG. 6 is a sequence chart illustrating the flow of processes for setting an avatar in the system of FIG. 1 according to exemplary aspects of the present disclosure.

As shown in FIG. 6, the face image of the player is first photographed with the assist terminal 60 (step S10). The face image may be photographed for each player, and the face images of the first player and the second player may be photographed together.

Face image information generated through photographing is transmitted from the assist terminal 60 to the game processing device 10 (step S11). The image generator 11b of the game processing device 10 extracts the feature of each player, for example, the positions of the eyes, nose, and mouth, from the face image information, represents the face part reflecting the extracted feature through CG, and generates information of the face part of the avatar. The image generator 11b uses the information of the costume stored in advance in the game processing device 10 and the information of the generated face part to form an avatar in which the face part is incorporated in the costume and generate avatar information used to render the avatar (step S12). The costume includes, for example, clothes, shoes, gloves, hat, and various accessories.

The image generator lib associates the generated avatar information with the identification information of each player and causes the avatar information to be included in the player data 12b and stored in the data memory 12 (step S13).

The costume may be selected by the player. For example, multiple selectable costumes are displayed on the assist terminal 60 so that the player can select the costumes by operating the assist terminal 60. The information indicating the selected costume is transmitted from the assist terminal 60 to the game processing device 10, and the image generator 11b generates the avatar information so as to incorporate the face part, which is generated from the face image information, into the selected costume.

In the virtual space Vs, the avatar corresponding to the first player is arranged in accordance with the position and orientation of the HMD 20A, and the avatar corresponding to the second player is arranged in accordance with the position and orientation of the HMD 20B. For example, the head of the avatar corresponding to the first player is arranged at the position of the first virtual point 100A, and the head of the avatar corresponding to the second player is arranged at the position of the second virtual point 100B. The movement of each HMD 20, i.e., the movement of each virtual point, moves the corresponding avatar.

The position of the head of the avatar is set in accordance with the position of the HMD 20 in the up-down direction. Further, the position of the hand of the avatar is set in accordance with the position of a weapon, which is arranged in accordance with the position and orientation of the operation device 30, and represented as if the avatar has the weapon. It is preferable that the position of the head of the avatar changes as the position of the HMD 20 in the up-down direction changes and that the torso and the leg of the avatar be represented as crouching down or jumping in accordance with the position of the head of the avatar.

Additionally, in order for the player to check the avatar, the following process may be performed. Before outputting the image of a field where the game is performed, the image of the virtual space Vs, which is a room or the like where the mirror is placed, may be output to the HMD 20. Then, in accordance with the position and orientation of the HMD 20, the image generator 11b may generate image information including the avatar corresponding to the player as if reflected on the mirror in the virtual space Vs and output the generated image information to the HMD 20.

In the configuration of setting the avatar as described above, the face part of the avatar is generated based on the face image of the player, and the avatar resembling the player is thus generated. Accordingly, the similarity between the player and the avatar increases so that the player, other players, and the user looking at the public display 50 have a stronger affinity to the avatar as a virtual self of the player. Further, in some cases, a humanoid object such as a character appears in addition to the avatar in the virtual space Vs. Thus, in a conventional game, it may be difficult to identify the avatars of other players from multiple humanoid objects. In the present embodiment, since the face part of an avatar is generated based on the face image of the player, the avatars of other players can be easily identified.

Further, since the position of the head of an avatar is set in accordance with the position of the HMD 20 in the up-down direction, the height relationship of the first player and the second player is reflected on the height relationship of the avatar of the first player and the avatar of the second player. In addition, when the avatar reflected in the mirror in the virtual space Vs is viewed by the player, the player sees the avatar as if having the same height as the player. Thus, the similarity between the player and the avatar increases so that the player has a stronger affinity to the avatar.

[Game Configuration]

The various processes executed by the game processing device 10 for the game to progress will now be described with reference to FIGS. 7 to 16.

As described above, in the present embodiment, in the game implemented in the game system, the player shoots a target object, which represents an enemy moving in the virtual space Vs, by operating the operation device 30. The attack on the enemy is roughly categorized into three types of attacks, namely, normal attack, simultaneous attack, and combination attack. These attacks will be described sequentially.

First, prior to the description of the attack, the process for restricting movement of a player will be described with reference to FIGS. 7 to 9. In the present embodiment, two players perform operations in one play space Rs while playing the game. Each player wears the HMD 20. Thus, it is difficult to visually recognize the position of the other player in the play space Rs. Thus, in such a situation, there is a demand for a strategy to prevent the players from unintentionally contacting with each other in the play space Rs. In particular, when the game requires operation in which the two players to move toward each other, the strategy is highly useful. The strategy will hereinafter be described.

In the present embodiment, for each player, a range in which the player is permitted to move is set. In other words, for each HMD 20, a range in which the HMD 20 is permitted to move is set. More specifically, in the game processing device 10, a movement permission region, in which the virtual point 100 is permitted to move as the HMD 20 moves, is set in the virtual space Vs.

Figure 7:
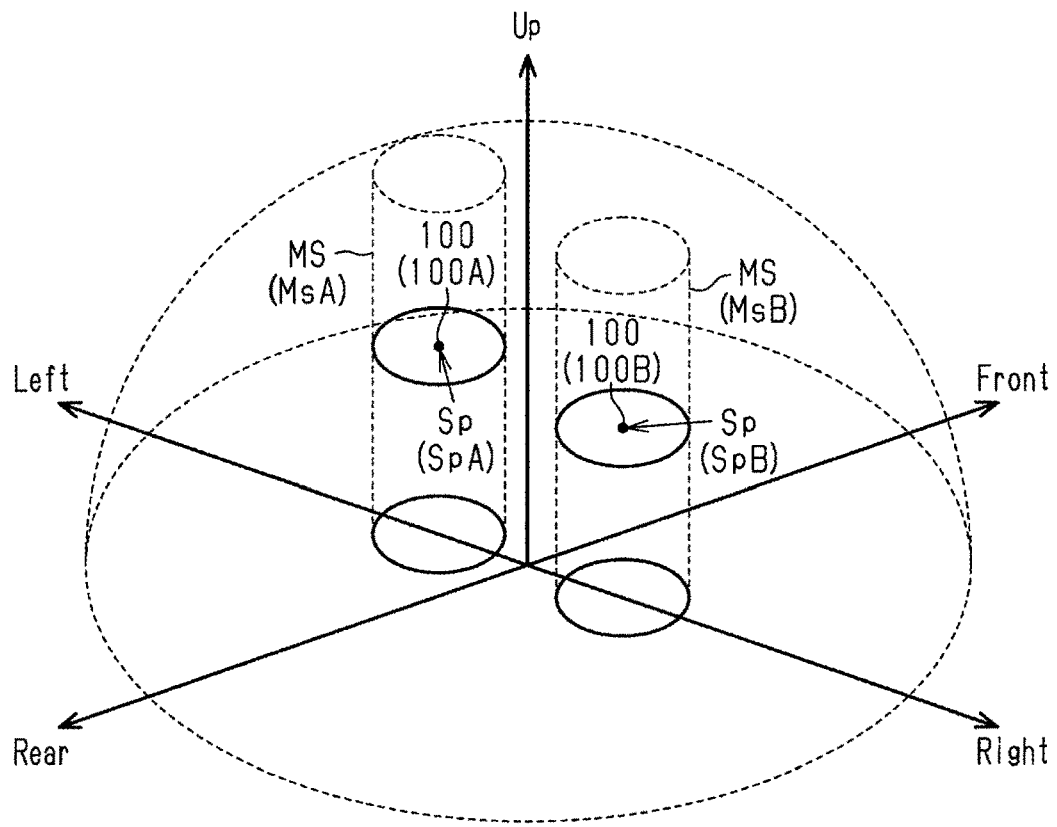
FIG. 7 is a diagram illustrating an example of setting of a movement permission region in the virtual space of FIG. 3 according to exemplary aspects of the present disclosure.

As shown in FIG. 7, the movement permission region Ms encircles the initial position Sp of the virtual point 100. Normally, the players contact with each other when moving in the horizontal direction. Thus, the movement permission region Ms simply needs to have a range with respect to the horizontal direction, i.e., the front-rear direction and the left-right direction. For example, in the horizontal plane including the initial position Sp of the virtual point 100, the movement permission region Ms has a circular shape with the initial position Sp located in the center. The region that matches the circular region in the position in the front-rear direction and the left-right direction, i.e., a cylindrical region extending from the circular region in the up-down direction, is referred to as the movement permission region Ms in the virtual space Vs. The position information of the initial position Sp of the virtual point 100 and the movement permission region Ms is included and stored in the game space data 12a.

The movement permission region Ms is set for each HMD 20, i.e., each virtual point 100. The movement permission region Ms set for the first virtual point 100A is a first permission region MsA, and the movement permission region Ms set for the second virtual point 100E is a second permission region MsB. The first permission region MsA and the second permission region MsB are set such that they are spaced apart from each other and they do not overlap with each other. For example, the movement permission regions Ms are arranged at the same position in the front-rear direction and arranged at different positions in the left-right direction.

The progress manager 11c of the game processing device 10 sets a region indicator, which indicates the movement permission region Ms, in the virtual space Vs when a predetermined condition is satisfied, and the image generator 11b generates image information including the region indicator and outputs the generated image information to the HMD 20.

Figure 8:
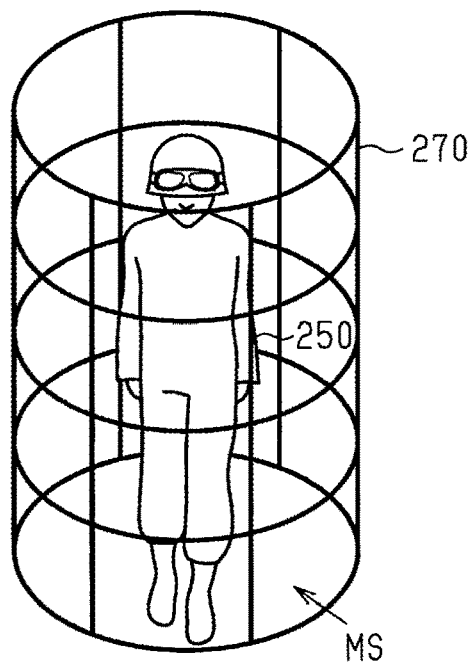
FIG. 8 is a diagram illustrating an example of a region indicator in the virtual space of FIG. 3 according to exemplary aspects of the present disclosure.

FIG. 8 shows a region indicator 270 together with the avatar 250, which is located in the movement permission region Ms. The region indicator 270 is a tubular object having a mesh-pattern circumferential wall. The region indicator 270 is located on the boundary between the inner side and the outer side of the movement permission region Ms to indicate the position of the movement permission region Ms. That is, the region indicator 270 is a tubular object encircling the initial position Sp of the virtual point 100 and extending in the up-down direction.

In FIG. 8, to facilitate understanding, the region indicator 270 is shown in a viewpoint from the outer side of the movement permission region Ms. In a viewpoint from the player, i.e., in a viewpoint from the inner side of the movement permission region Ms, the mesh-pattern circumferential wall of the region indicator 270 is seen in a viewpoint from the inner side of the tube, and the scene of the outer side of the movement permission region Ms is seen from through the meshes.

The process for switching the region indicator 270 between a displayed state and a non-displayed state will now be described with reference to FIG. 9. The flowchart shown in FIG. 9 is a process performed by the progress manager 11c of the game processing device 10. The process is started after setting the virtual point 100 and repeated while the game continues. The region indicator 270 is not displayed when the process starts. The process shown in FIG. 9 is performed for each HMD 20, i.e., performed for each virtual point 100 set in accordance with the HMD 20.

In step S20, the progress manager 11c refers to the position information of the virtual point 100 at the moment that moves as the HMD 20 moves to determine whether or not the boundary distance between the virtual point 100 and the outer edge of the movement permission region Ms set for the virtual point 100 is less than or equal to a predetermined threshold value. The boundary distance used for the determination is a minimum distance on the horizontal plane between the virtual point 100 and the outer edge of the movement permission region Ms.

If the boundary distance is greater than the threshold value (step S20: negative determination), the progress manager 11c repeats the process of step S20. For example, if the movement of the HMD 20 from the reference position is small like immediately after the game starts, the movement of the virtual point 100 from the initial position is also small. Thus, the negative determination is made in step S20.

If the boundary distance is less than or equal to the threshold value (step S20: affirmative determination), as a process of step S21, the progress manager 11c updates the position information of the object in the virtual space Vs so as to arrange the region indicator 270 at a predetermined position of the virtual space Vs, i.e., on the boundary of the movement permission region Ms. Using the updated information, the image generator 11b generates and outputs the image information for the HMD 20 to display the region indicator 270.

After the process of step S21, the progress manager 11c, as a process of step S22, refers to the position information of the virtual point 100 at the moment to determine whether or not the boundary distance exceeds the threshold value. If the boundary distance is less than or equal to the threshold value (step S22: negative determination), the progress manager 11c repeats the process of step S22. During the process, the HMD 20 continues to display the region indicator 270 on the boundary of the movement permission region Ms.

If the boundary distance is greater than the threshold value (step S22: affirmative determination), the progress manager 11c, as a process of step S23, updates the position information of the object in the virtual space Vs so as to clear the region indicator 270 from the virtual space Vs, i.e., so as not to display the region indicator 270 in the virtual space Vs. Using the updated information, the image generator 11b generates and outputs the image information for the HMD 20 to stop displaying the region indicator 270.

Afterwards, the progress manager 11c repeats the processes of steps S20 to S23 so that the HMD 20 displays the region indicator 270 when the boundary distance is less than or equal to the threshold value and the HMD 20 does not display the region indicator 270 when the boundary distance is greater than the threshold value.

In the above configuration, when the virtual point 100 is located in a region where the distance from the virtual point 100 to the outer edge of the movement permission region Ms is less than or equal to the threshold value, i.e., when the player approaches the outer edge of the range in which the player is permitted to move, the HMD 20 displays the region indicator 270. More specifically, when the distance between the virtual point 100A and the outer edge of the first permission region MsA is less than or equal to the threshold value, the HMD 20A displays the region indicator 270 indicating the first permission region MsA, and when the distance between the virtual point 100B and the outer edge of the second permission region MsB is less than or equal to the threshold value, the HMD 20B displays the region indicator 270 indicating the second permission region MsB.

Such a configuration allows the player to perceive the movement permission region Ms. This guides the player to move without the position of the player in the virtual space Vs moving out of the movement permission region Ms. Thus, the range in which the player moves in the play space Rs can be limited. Since the first permission region MsA and the second permission region MsB are spaced apart from each other, the first player and the second player do not contact with each other in the play space Rs. The threshold value of the boundary distance simply needs to be set to a distance in accordance with, for example, the size of the movement permission region Ms.

The region indicator 270 may always be displayed. In the same manner as above, this allows the player to perceive the movement permission region Ms and limit the range where the player moves in the play space Rs. Nevertheless, the field of view of the player can further be prevented from remaining obstructed by the region indicator 270 by displaying the region indicator 270 only when the virtual point 100 and the outer edge of the movement permission region Ms move toward each other, i.e., only when the player is highly likely to move to such a large extent that the virtual point 100 moves out of the movement permission region Ms. This hinders the region indicator 270 from serving as an obstacle to the play and reminds the player of the position of the player approaching the outer edge of the movement permission region.

Further, the region indicator 270 is not limited to a tubular object having a mesh-pattern circumferential wall and simply needs to indicate the movement permission region Ms. For example, the region indicator 270 may be a tubular or post-shaped semitransparent object. However, when the region indicator 270 is tubular, it is easy to identify the boundary between the inner side and the outer side of the movement permission region Ms. Further, as compared to a plate-shaped circumferential wall, the mesh-pattern circumferential wall reduces a portion of the field of view of the player obstructed by the region indicator 270. This allows the player to easily perceive the states of the surroundings in the virtual space Vs even when the region indicator 270 is displayed.

Further, the shape of the movement permission region Ms may differ from a cylindrical shape depending on the movement of the player required in the game. In this case, the region indicator 270 simply needs to be an object shaped in conformance with the shape of the movement permission region Ms.

Additionally, text or audio guidance that advises the player not to move out of the movement permission region Ms may be given to the player via the HMD 20 together with the region indicator 270.

Figure 9:
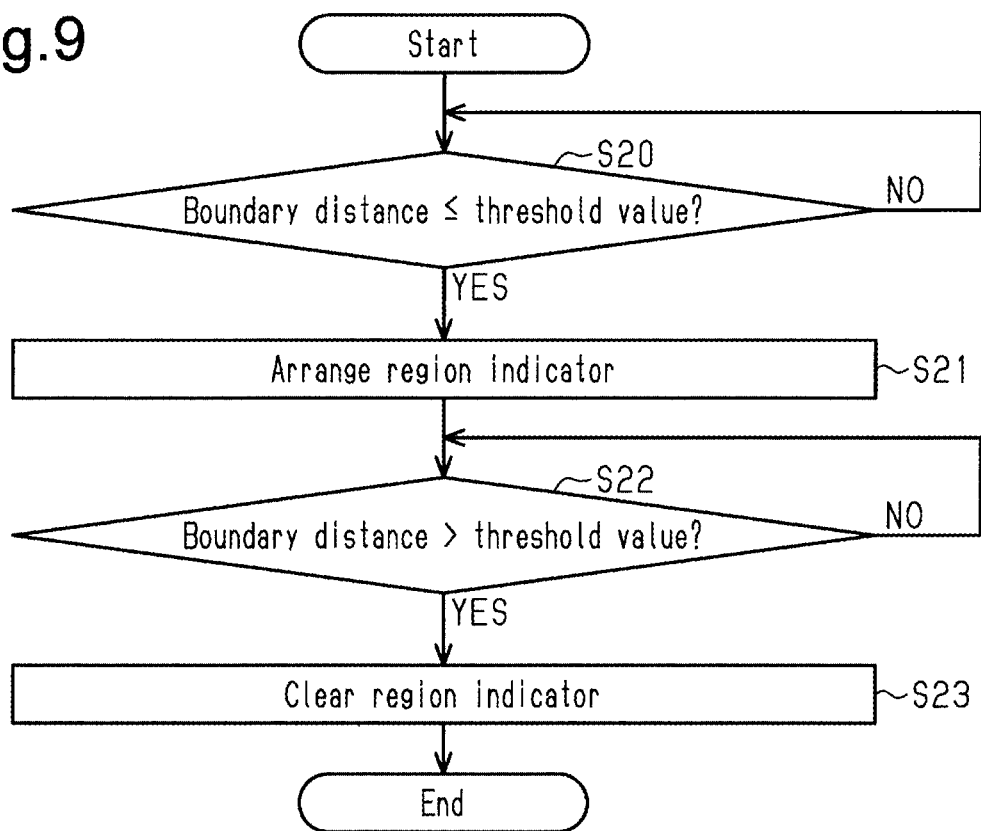
FIG. 9 is an algorithmic flowchart illustrating the flow of processes for switching the region indicator between a displayed state and a non-displayed state in the system of FIG. 1 according to exemplary aspects of the present disclosure.

The process shown in FIG. 9 is a process performed when determining that the virtual point 100 is located in the movement permission region Ms. When the virtual point 100 is determined to be located in the movement permission region Ms, it is preferable that the same process as step S21 be performed and that the region indicator 270 remain displayed while the virtual point 100 is located outside the movement permission region Ms. This allows the player to perceive the movement permission region Ms and guides the player to move to the movement permission region Ms.

In the same manner as the image information output to the HMD 20, the image information output to the public display 50 may or may not include the region indicator 270.

[Normal Attack]

Figure 10:
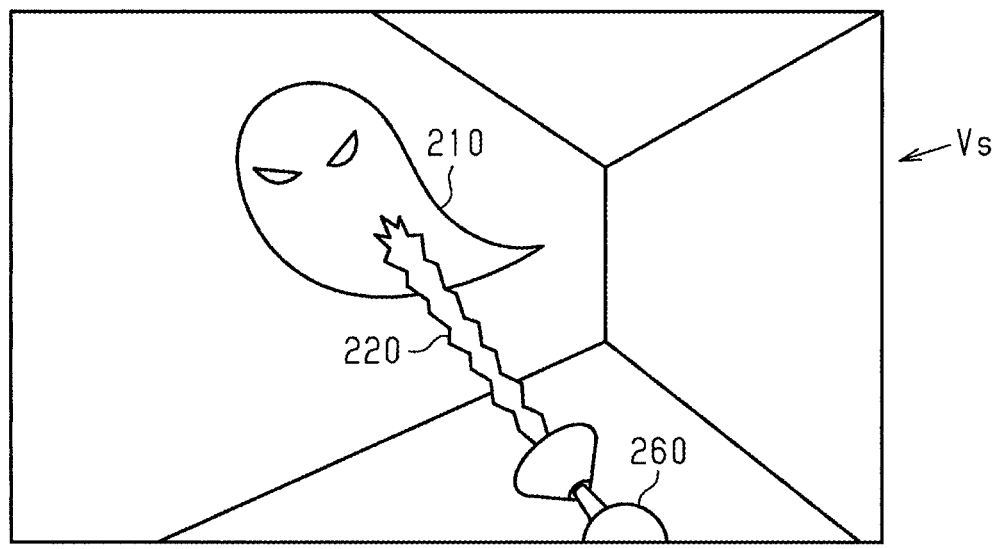
FIG. 10 is a diagram illustrating an example of a view of the virtual space when a normal attack is being performed in the system of FIG. 1 according to exemplary aspects of the present disclosure.

The normal attack will now be described with reference to FIG. 10.

When the player performs an on-operation, which is a predetermined operation such as pressing an operation button, on the operation device 30, a signal indicating the on-operation is input from the operation device 30 to the game processing device 10 via the HMD 20. The game processing device 10 detects the on-operation in the operation device 30.

When the game processing device 10 detects the on-operation, the progress manager 11c performs the following process. As shown in FIG. 10, the progress manager 11c updates the position information of the object in the virtual space Vs so that an effect object 220 is arranged from the position of the weapon 260, which is located in the virtual space Vs, toward the orientation of the operation device 30 based on the position and orientation of the operation device 30. The effect object 220 indicates an attack such as a beam emitted from the weapon 260. Using the updated information, the image generator 11b generates and outputs the image information so that the HMD 20 and the public display 50 display the effect object 220.

In addition, the progress manager 11c refers to the position information of the target object 210 at the moment, which indicates an enemy, to determine whether or not the target object 210 is located in the direction pointed by the effect object 220. When the target object 210 is located in the direction pointed by the effect object 220, the progress manager 11c determines that the attack is valid. When determining that the attack is valid, the progress manager 11c performs a process that is set as a process performed when the enemy is defeated. For example, the process is to set the display indicating that the enemy is defeated to the virtual space Vs and to record a score for the player.

Additionally, when the target object 210 is located in the direction pointed by the effect object 220, the progress manager 11c may arrange, in the virtual space Vs, an indicator indicating that the weapon 260 is targeted on the target object 210 based on the position and orientation of the operation device 30 and the position information of the target object 210. Such an indicator is embodied in, for example, a concentric mark that indicates a target by being overlapped with the target object 210.

The items that may be set for the target object 210 will now be described.

Information related to each target object 210 is set for the target object 210. The information includes a parameter associated with the target object 210 such as a health value, which is a numerical value indicating health. The progress manager 11c may gradually reduce the set health value every time the attack is determined to be valid and perform a process executed in the case of defeating the enemy when the health value reaches zero. That is, the effect of the case of defeating the enemy is produced when the attack strikes the target object 210 a predetermined number of times or when the attack remains on the target object 210 for a predetermined time. In such a case, for each target object 210, an indicator such as a gauge indicating the remaining value of the health value may be arranged near the target object 210. Further, the information related to the target object 210 may include, in addition to or instead of the health value, a level, rarity, hit point (HP), attack power, recover ability, attribute, and the like.

Further, multiple types of target objects 210 that differ in the difficulty for the player to defeat the enemy may appear. For example, a target object 210 that receives a larger damage from the attack of the first player than from the attack of the second player, a target object 210 that receives a larger damage from the attack of the second player than from the attack of the first player, and a target object 210 that receives the same damage from the attack of the first player and the attack of the second player may exist so that the target objects 210 is identifiable from the outer appearance such as color or shape.

When the multiple types of target objects 210 appear, the progress manager 11c may change the damage given to a subject target object 210 in which the attack is determined to be valid, i.e., the reduction amount of the health value, based on whether or not the operation device 30 on which the on-operation has been performed is associated with the HMD 20A or the HMD 20B and based on the type of the target object 210. Instead of changing the reduction amount of the health value, for example, damage may be differentiated by reducing the health value for the attack from one player and by stopping movement of the target object 210 without reducing the health value for the attack from the other player.

The existence of multiple types of target objects 210 that differ depending on the players in the difficulty for the players to defeat enemies allows the first player and the second player to cooperate in playing the game by planning a strategy for completing the game, for example, concentrating on defeating an enemy that can be easily defeated by each player.

Further, the target object 210 may be able to attack the player. For example, the progress manager 11c determines that the attack from the target object 210 is valid when the target object 210 remains located within a predetermined range proximate to the position of the player, i.e., proximate to the position of the virtual point 100, for a predetermined time. More specifically, when the target object 210 sticks to the avatar corresponding to the player for the predetermined time, the attack is determined to be valid. The player-related information is associated with each player. The information includes a parameter related to continuing the game such as the health value or the number of times the game can be continued even if the player receives damage. When determining that the attack from the target object 210 is valid, the progress manager 11c reduces the parameter. The indicator such as a gauge indicating such a parameter is arranged in, for example, a range that can be viewed from the player in the virtual space Vs, such as the vicinity of the weapon 260. When the parameter is reduced to such a value that the game cannot be continued, the player is unable to perform an action such as an attack.

If a target object 210 receiving a larger damage from one player (for example, second player) than from the other player (for example, first player) is set to attack the first player, the first player can be saved when the second player attacks the target object 210, which attacks the first player, to be greatly damaged and defeated. This also allows the first player and the second player to cooperate in playing the game.

The parameter related to continuing the game may be recovered by defeating the target object 210. For example, when the progress manager 11c determines that a predetermined target object 210 has been defeated or determines that a predetermined number of target objects 210 have been defeated, the progress manager 11c increases the parameter, for example, increases the health value.

When the parameters of both the first player and the second player are reduced to such values that the game cannot be continued, the game ends. When the parameter of only one of the players is reduced to such a value that the game cannot be continued, he or she cannot play the game and only the other player continues the game. The player who can no longer play the game may be indicated by changing the displayed state of the avatar (at least one of brightness, saturation, and hue) and displaying the avatar with the changed displayed state, for example, by graying out. In addition, by changing and displaying the displayed state (at least one of brightness, saturation, and hue) or the like of the virtual space Vs, it may be implied in the HMD 20 of the player that the player cannot play the game. In this case, the parameter of the player who cannot play the game may recover as the time elapses or when the other player accomplishes a predetermined task for the player who cannot play the game to restart playing the game.

Figures 11, 12:
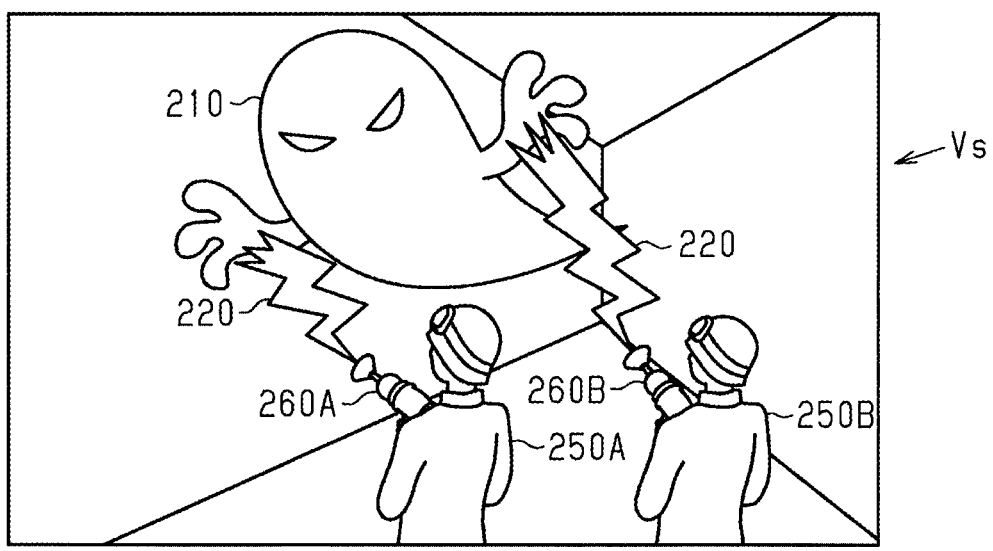
FIG. 11 is a table illustrating an example of data included in game progress data in the system of FIG. 1, in which the data includes player-related information according to exemplary aspects of the present disclosure.
FIG. 12 is a diagram illustrating an example of a view of the virtual space when a simultaneous attack is being performed in the system of FIG. 1 according to exemplary aspects of the present disclosure.

The information related to the setting of the target object 210 and the player, i.e., the information indicating the type or the health value of each target object 210 and the above parameters of the player, is included in the game progress data 12c and stored in the data memory 12 and are updated as the game progresses. As one example, among the data of the game progress data 12c, FIG. 11 shows the data of the player-related information including the information indicating the parameters related to continuing the game.

[Simultaneous Attack]

The simultaneous attack will now be described with reference to FIG. 12. In the simultaneous attack, the first player and the second player simultaneously attack the same target object 210.

The progress manager 11c determines that the simultaneous attack has been performed on the same target object 210 when simultaneously making the determination that the attack performed by the first player, i.e., the attack based on the on-operation of the operation device 30A, is valid, and making the determination that the attack performed by the second player, i.e., the attack based on the on-operation of the operation device 30B, is valid. When determining that the simultaneous attack has been performed, the progress manager 11c performs a process for producing a first effect, which is a special effect.

Unlike the effect produced when determining the normal attack to be valid, the special effect allows the player to attack a target object 210 more advantageously than the normal attack. For example, the first effect may be an effect for setting the attack power to be larger than the normal attack. That is, as a process for producing the first effect, the progress manager 11c may reduce the parameter such as the health value set for the target object 210 to a larger extent than the total amount of reduction when each player separately performs the normal attack. In addition, for example, the first effect may be to stop moving the target object 210 or to identifiably display a weak part of the target object 210, i.e., a part of the target object 210 that receives a larger damage when attacked than other parts by, for example, exposing the part.

Further, it is preferable that the progress manager 11c change the configuration of the virtual space Vs for the HMD 20 to display differently as the first effect is produced. For example, as shown in FIG. 12, the progress manager 11c may change the effect object 220 to an object that is more noticeable than that of the normal attack. This allows the player to visually ascertain the production of the first effect. FIG. 12 shows the virtual space Vs in a state in which the simultaneous attack is being performed, as viewed from behind the first player and the second player.

Additionally, when the attack strikes a particular part of the same target object 210, it may be determined that the simultaneous attack has been performed to produce the first effect. For example, as shown in FIG. 12, when the attack of one of the players strikes one of the two hand parts of the enemy indicated by the target object 210 and the attack of the other one of the players strikes the other one of the two hand parts, it may be determined that the simultaneous attack has been performed. In this case, the progress manager 11c refers to the position information of the two hand parts to determine that the simultaneous attack has been performed when simultaneously making the determination that the attack based on the on-operation of the operation device 30A is valid on one of the two hand parts and the determination that the attack based on the on-operation of the operation device 30B is valid on the other one of the two hand parts. Based on these determinations, the first effect is produced.

When the same target object 210 is located in the direction pointed by the weapon 260A and the weapon 260B, the progress manager 11c may arrange, in the virtual space Vs, an indicator that differs from that of the normal attack in color, size, shape, or the like as an indicator indicating that the weapons 260 are targeted on the target object 210.

As described above, when the simultaneous attack can be performed, the first player and the second player perform the simultaneous attack, i.e., produce the first effect. This allows the first player and the second player to cooperate in playing the game.

[Combination Attack]

The combination attack will now be described with reference to FIGS. 13 to 15. The condition for performing the combination attack is determined to be satisfied when the following three conditions are satisfied. A first condition is that the player has accomplished a predetermined task in the game. A second condition is that the virtual distance dv, which is the horizontal distance between the first virtual point 100A that moves as the HMD 20A moves and the second virtual point 100B that moves as the HMD 20B moves, is less than or equal to the reference distance, which is a predetermined distance. A third condition is that a predetermined operation has been performed with the operation device 30. The three conditions will be described sequentially.

The predetermined task in the first condition is set as a task that can be accomplished by repeating the normal attack or the combination attack, for example, a task of obtaining a predetermined score by defeating a predetermined number of target objects 210 or defeating a target object 210. The task may be set for each player so that the first condition is satisfied when at least one of the first player and the second player has accomplished the task or when the first player and the second player have both accomplished the task. Alternatively, the task may be a task shared by the first player and the second player, for example, a task in which the total number of target objects 210 defeated by the first player and the second player has reached a predetermined number.

The indicator such as a gauge indicating the accomplishment state of the task is arranged in a range that can be viewed from the player in the virtual space Vs, for example, in the vicinity of the weapon 260, in order for the player to ascertain whether or not the first condition is satisfied. The progress manager 11c includes the accomplishment state of the task in the game progress data 12c and records it in the data memory 12, as illustrated in FIG. 11, as the gameplay progresses.

In the second condition, the reference distance is set to be greater than or equal to the minimum distance in the horizontal direction between the first permission region MsA, which is the movement permission region Ms set for the first virtual point 100A, and the second permission region MsB, which is the movement permission region Ms set for the second virtual point 100B. That is, the reference distance is set such that the virtual distance dv can be less than or equal to the reference distance when the first virtual point 100A is located in the first permission region MsA and the second virtual point 100B is located in the second permission region MsB.

Figure 13:
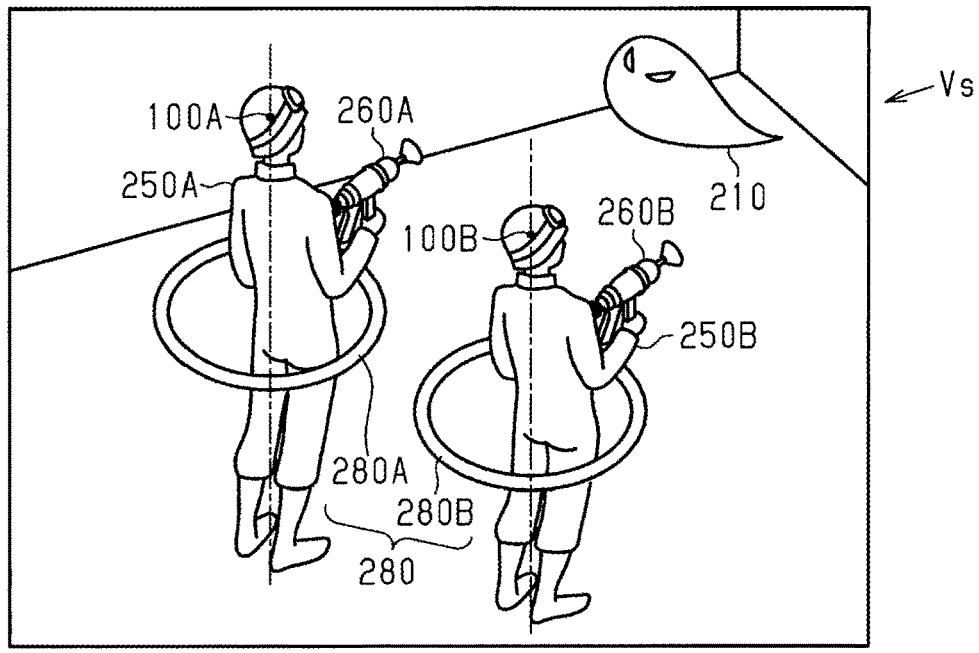
FIG. 13 is a diagram illustrating an example of a range indicator in the system of FIG. 1 according to exemplary aspects of the present disclosure.
Figure 14:
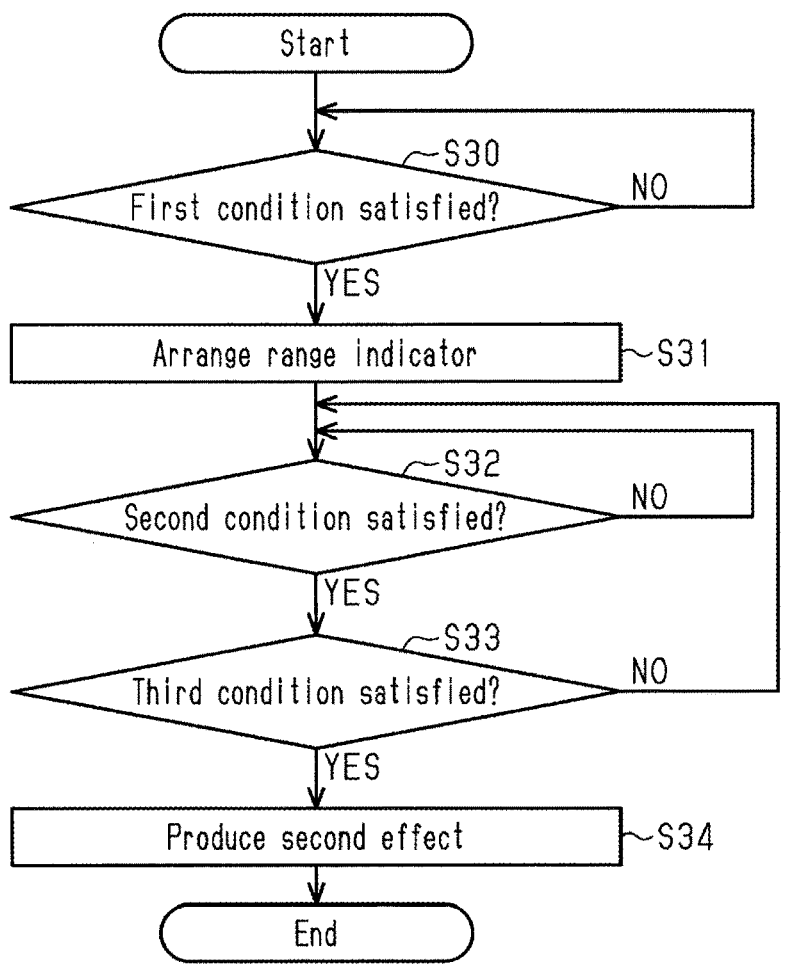
FIG. 14 is an algorithmic flowchart illustrating the flow of processes for performing a combination attack in the system of FIG. 1 according to exemplary aspects of the present disclosure.

As shown in FIG. 13, range indicators 280 that allow for determination of whether or not the virtual distance dv is less than or equal to the reference distance are arranged in the virtual space Vs for the players to ascertain whether or not the second condition is satisfied. The range indicators 280 include, for example, two annular ring objects 280A and 280B. The ring objects 280A and 280B are arranged one by one at a position encircling the avatar 250 corresponding to each player. That is, the ring object 280A encircles the avatar 250A around a point where the coordinates on the horizontal plane correspond to the first virtual point 100A, i.e., a point on a straight line extending through the first virtual point 100A in the up-down direction, and the ring object 280B encircles the avatar 250B around a point where the coordinates on the horizontal plane correspond to the second virtual point 100B. The position of each of the ring objects 280A and 280B in the up-down direction may be, for example, any position from the floor surface to the virtual point 100 in the virtual space Vs. The radius of each of the ring objects 280A and 280B is half as long as the reference distance. When the two ring objects 280A and 280B overlap with each other, i.e., when the region encircled by the ring object 280A and the region encircled by the ring object 280B include a region where the position coordinates correspond to each other on the horizontal plane, the virtual distance dv is less than or equal to the reference distance.

Thus, depending on whether or not the two ring objects 280A and 280B overlap with each other, the first player and the second player can determine whether or not the second condition is satisfied. When the two ring objects 280A and 280B move so as to overlap with each other, the second condition can be satisfied.

Although the range indicator 280 may always be displayed, it is preferable that the range indicator 280 be displayed when at least one of the first condition and the third condition is satisfied. In particular, it is preferable that the range indicator 280 be displayed when the first condition is satisfied. In the case in which the range indicator 280 is displayed only when almost satisfying the conditions that enable the combination attack, the indicator 280 is further prevented from entering the field of view of the player and continuing to obstruct the field of view. Further, the player can be reminded of the condition that enables the combination attack almost being satisfied.

To facilitate understanding, FIG. 13 shows a state in which the ring objects 280A and 280B are arranged around the avatars 250 respectively corresponding to the first player and the second player, as viewed from behind each player. From the viewpoint of each player, the ring object 280A or 280B encircling the player is seen, and the ring object 280A or 280B encircling the avatar 250 corresponding to the other player is seen around that avatar 250.

The predetermined operation in the third condition is to, for example, press-and-hold the operation button and preferably differs from the operation for performing the normal attack. The third condition may be satisfied when the first player and the second player both perform the predetermined operation, i.e., when the predetermined operation is performed by both the operation device 30A and the operation device 30B. The third condition may also be satisfied when the predetermined operation is performed by at least one of the operation device 30A and the operation device 30B. As another option, different operations may be set for the first operation device 30A and the second operation device 30B as the predetermined operation in the third condition, and the third condition may be satisfied when the predetermined operation is performed with each operation device 30.

The process performed by the progress manager 11c of the game processing device 10 for executing the combination attack will now be described with reference to FIG. 14. The flowchart of FIG. 14 is a process repeated while the game continues.

In the process of step S30, the progress manager 11c refers to the game progress data 12c to determine whether or not the first condition is satisfied, i.e., whether or not the task has been accomplished. If the first condition has not been satisfied (step S30: negative determination), the progress manager 11c repeats the process of step S30.

If the first condition is satisfied (step S30: affirmative determination), the progress manager 11c, as a process of step S31, updates the position information of the object in the virtual space Vs so as to arrange the ring objects 280A and 280B, which are the range indicators 280, at the positions encircling the avatars 250 in the virtual space Vs. Using the updated information, the image generator 11b generates and outputs the image information for the HMD 20 and the public display 50 to display the range indicators 280.

After the process of step S31, the progress manager 11c, as a process of step S32, refers to the position information of each virtual point 100 at the moment to determine whether or not the second condition is satisfied, i.e., whether or not the virtual distance dv is less than or equal to the reference distance. If the second condition has not been satisfied (step S32: negative determination), the progress manager 11c repeats the process of step S32.

If the second condition is satisfied (step S32: affirmative determination), the progress manager 11c, as a process of step S33, refers to a signal indicating operation performed with the operation device 30, which is input from the HMD 20, to determine whether or not the third condition is satisfied, i.e., whether or not the predetermined operation is detected with the operation device 30. If the third condition has not been satisfied (step S33: negative determination), the progress manager 11c repeats the processes of steps S32 and S33, i.e., the processes for determining whether or not the second condition and the third condition are satisfied.

If the third condition is satisfied (step S33: affirmative determination), the progress manager 11c, as a process of step S34, performs a process for performing the combination attack, i.e., a process for producing a second effect, which is a special effect. The three conditions need to be simultaneously satisfied. Through the processes of steps S32 and S33, the progress manager 11c determines whether or not the second condition and the third condition are simultaneously satisfied, i.e., whether or not the predetermined operation is performed by the operation device 30 when the virtual distance dv is less than or equal to the reference distance.

Unlike the effect produced when determining the normal attack to be valid, the second effect allows the player to attack a target object 210 more advantageously than the first effect. For example, the second effect may be an effect for setting the attack power to be larger than the normal attack and the simultaneous attack. That is, as a process for producing the second effect, the progress manager 11c may reduce the parameter such as the health value of the target object 210 to a larger extent than the amount of reduction when the normal attack and the simultaneous attack are performed. The determination of whether or not the combination attack is valid is made in the same manner as the determination of whether or not the normal attack is valid.

Further, it is preferable that the progress manager 11c change the configuration of the virtual space Vs for the HMD 20 to display differently as the second effect is produced. For example, as shown in FIG. 15, the progress manager 11c may change the effect object 220 to an object that is more noticeable than those of the normal attack and the simultaneous attack. This allows the player to visually ascertain the production of the second effect. FIG. 15 shows a state in which the combination attack is being performed, as viewed from behind the first player and the second player.

Figure 15:
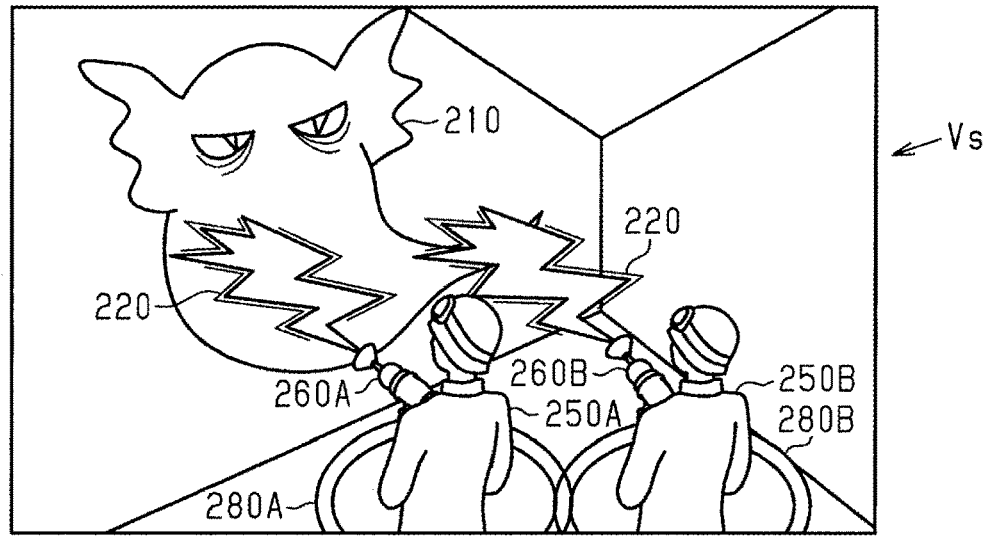
FIG. 15 is a diagram illustrating an example of a view of the virtual space when the combination attack is being performed in the system of FIG. 1 according to exemplary aspects of the present disclosure.

FIG. 15 shows an example in which the effect objects 220 are arranged so as to be emitted respectively from the weapon 260A, which is possessed by the avatar 250A of the first player, and the weapon 260B, which is possessed by the avatar 250B of the second player. Instead, the effect objects 220 may be arranged so that one effect object 220 is emitted from the weapons 260A and 260B. That is, when the condition is satisfied, each of the first player and the second player may perform the combination attack on a single target object 210 or the corresponding target object 210. Alternatively, the first player and the second player may jointly perform the combination attack on a single target object 210.

The second effect may last only during a period in which the above three conditions are satisfied. Instead, even if any one of the three conditions is not satisfied after the production of the second effect, the second effect may last. More specifically, the second effect may last during a period in which the virtual distance dv is less than or equal to the reference distance after the production of the second effect, and the second effect may last even if the virtual distance dv exceeds the reference distance after the production of the second effect. In this case, for example, the second effect lasts only for a predetermined time and then disappears. When the second effect disappears, the accomplishment state of the task in the first condition returns to the initial state. Then, the players again progress the game so as to satisfy the three conditions. This allows for the combination attack.

Further, the lasting of the second effect, i.e., the combination attack being performed, may be identifiable by switching the indicator of the weapon 260. For example, starting of the period in which the combination attack is performed may be indicated by transforming the weapon 260, such as by opening and emitting part of the weapon 260 from which a beam or the like is emitted, and ending of the period in which the combination attack is performed may be indicated by returning the transformation of the weapon 260, such as by closing the emitting part of the weapon 260. Alternatively, while the combination attack is being performed, the weapon 260 may be changed to a weapon looking different from that used for the normal attack or the simultaneous attack. Such a configuration allows the player to easily perceive when the performing period of the combination attack starts and ends.

While the second effect lasts, when the target object 210 is located in the direction pointed by the weapon 260, the progress manager 11c may arrange, in the virtual space Vs, an indicator that differs from that of the normal attack or the simultaneous attack in color, size, shape, or the like as an indicator indicating that the weapon 260 is targeted on the target object 210.

Since the combination attack can be performed as described above, the first player and the second player can cooperate in playing the game to perform the combination attack, i.e., produce the second effect. In particular, since the condition for performing the combination attack includes a condition in which the virtual distance dv is less than or equal to the reference distance, the first player and the second player attempt to perform operation in cooperation such that the distance therebetween in the virtual space Vs is less than or equal to the reference distance. This deepens the correlation between the cooperation of the two players in the virtual space Vs and the mutual operation relationship of the two players in the play space Rs during the cooperation. Setting the virtual distance dv to be less than or equal to the reference distance is a specific condition that can be set in a VR game in which two players participating in the game wear the HMDs 20 and operation of each player in one play space Rs is detected. That is, since the combination attack can be performed, gameplay taking advantage of the operation of the two players being detectable can be performed as gameplay in which the first player and the second player cooperate. This increases the originality of the game, makes the users more interested in the game, and consequently increases the number of users participating in the game.

Further, when the first effect and the second effect differ from each other, the enemy can be effectively defeated by consecutively performing the simultaneous attack and the combination attack. Particularly, the collaboration of the simultaneous attack and the combination attack functions effectively if the first effect is to lower the resistance of the target object 210 to the attack of the player, for example, to stop moving the target object 210 and to identifiably display a weak part of the target object 210 by exposing the weak part, and the second effect is to increase the attack power of the attack of the player.

[Modification of Combination Attack]

A modification of the combination attack will now be described. In the above combination attack, the second condition, which is one of the conditions for performing the combination attack, is that the distance between the virtual points 100 that move as the HMDs 20 move is less than or equal to the reference distance. Instead, the second condition may be that the distance between points in the virtual space Vs that move as the operation devices 30 move is less than or equal to a predetermined distance. That is, the virtual point that moves as the operation device 30A moves is set in the virtual space Vs based on the determination of the position and orientation of the operation device 30A. The virtual point corresponds to the positions of the operation device 30A and the hand of the first player in the virtual space Vs and is used as a reference for the arrangement of the weapon 260A. In the same manner, the virtual point that moves as the operation device 30B moves is set in the virtual space Vs based on the determination of the position and orientation of the operation device 30B. The second condition is that the horizontal distance between the virtual point corresponding to the operation device 30A and the virtual point corresponding to the operation device 30B is less than or equal to the predetermined distance.

In this case, it is preferable that the range indicator 280 that indicates whether or not the distance between the virtual points is less than or equal to the predetermined distance be arranged, for example, around the weapon 260 in the virtual space Vs. Even if either the distance between the virtual points corresponding to the positions of the HMDs 20 or the distance between the virtual points corresponding to the positions of the operation devices 30 is used as the condition for performing the combination attack, the range indicator 280 does not have to be annular and simply needs to allow for determination of whether or not the distance between the virtual points is less than or equal to the predetermined distance. For example, the range indicator 280 may indicate the difference of the distance between the virtual points and the predetermined distance with a gauge or the like.

In the above configuration, in order to perform the combination attack, the first player and the second player attempt to perform operation in cooperation such that the distance between the operation devices 30 in the virtual space Vs is less than or equal to the predetermined range. Thus, the first player and the second player can cooperate to play the game by taking advantage of the operations of the two players being detectable.

More specifically, the condition required to perform the combination attack simply needs to include, as the second condition, a condition in which the distance between a first position, which moves in the virtual space Vs in accordance with the position of the first player in the play space Rs, and a second position, which moves in the virtual space Vs in accordance with the position of the second player in the play space Rs, is less than or equal to the predetermined distance. The position of the first player and the position of the second player may be a position of any part of the players. For example, when the position of the player is identifiable based on the information detected by the HMD 20, the position of the player is the position of the head of the player. Further, for example, when the position of the player is identifiable based on the information detected by the operation device 30, the position of the player is the position of the hand of the player. Additionally, for example, when the players wear devices for detecting the positions of the torso and leg and the positions of the players are determined based on the information detected by the devices, the position of the player is the position of a part where each device is worn.

The first position and the second position simply need to be located to move in the virtual space Vs in accordance with the positions of the players. More specifically, the first position and the second position may be the positions of the virtual points 100 set based on the positions of the HMDs 20 or may be the positions in which the virtual points 100 are reflected on a virtual plane, such as a horizontal plane, set in the virtual space Vs. In the cases described with reference to FIGS. 13 to 15, each of the first position and the second position is where the virtual point 100 is projected on the horizontal plane, in other words, a position defined by the position coordinates on the horizontal plane of the virtual point 100. Further, the first position and the second position may be the positions of the virtual points 100 set based on the positions of the operation devices 30 and may be where the virtual points are projected on the virtual plane set in the virtual space Vs. In the cases described as the modification of the above combination attack, each of the first position and the second position is where the virtual point set based on the position of the operation device 30 is projected on the horizontal plane.

In each of the above cases of the combination attack, the condition for performing the combination attack simply needs to include at least the second condition, i.e., a condition in which the distance between the first position and the second position is less than or equal to the predetermined distance. In other words, the condition for performing the combination attack may be determined to be satisfied only when the second condition is satisfied or when the second condition and one of the first and third conditions are satisfied. Additionally, in order to perform the combination attack, a condition that differs from the first and third conditions may be required in addition to the second condition. As long as the condition for performing the combination attack includes the second condition, the first player and the second player can cooperate to play the game by taking advantage of the operation of the two players being detectable.

In addition, the second condition may be determined to be satisfied when the distance between the first position and the second position is within a predetermined range set in advance. This range is not limited to a range only having an upper limit as described above and may be a range having a lower limit and an upper limit or a range only having a lower limit.

Figure 16:
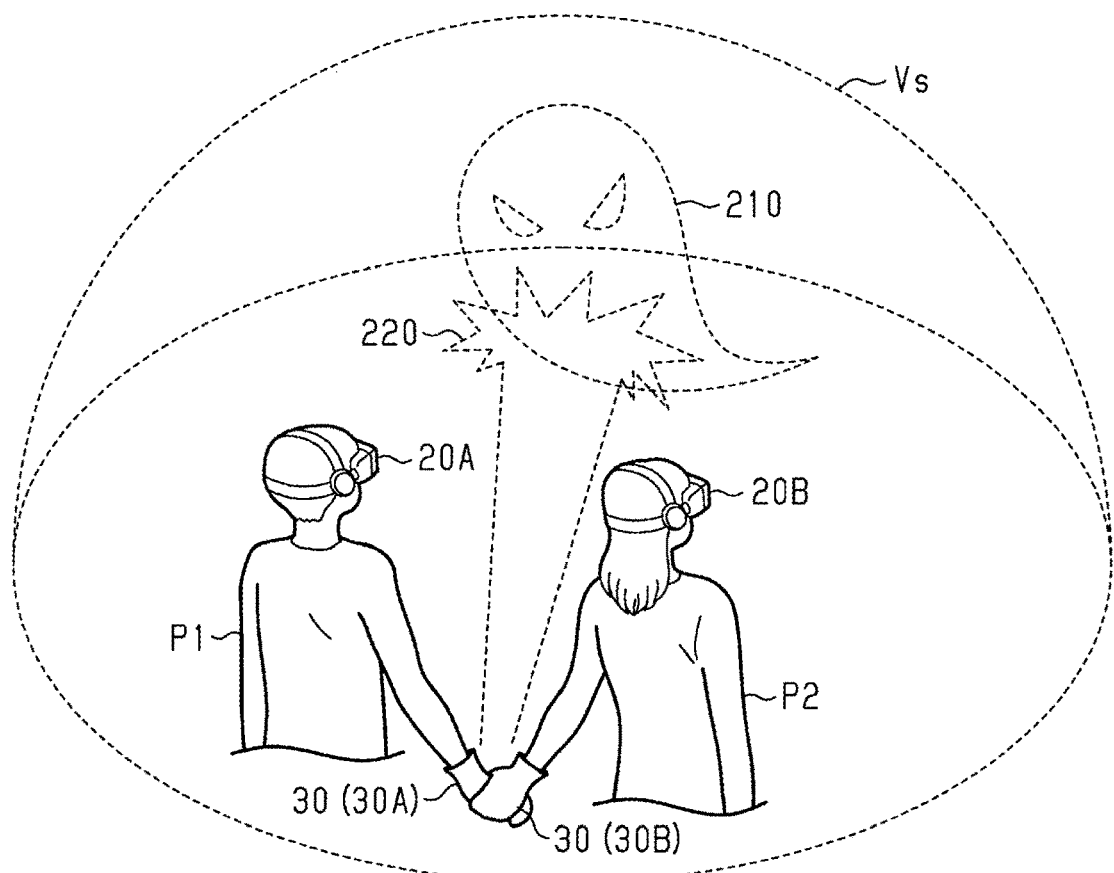
FIG. 16 is a diagram illustrating an example of operation of players and a view of the virtual space when the combination attack is being performed in accordance with exemplary aspects of the present disclosure.

As another modification of the combination attack, the second condition may be that the first player and the second player hold hands. For example, as shown in FIG. 16, each of the first player P1 and the second player P2 wears an operation device 30 that is glove-shaped or is shaped to be wearable on the wrist, the back of the hand, or the fingers. Based on the detection result from the tracking information detector 32 of each operation device 30, the game processing device 10 determines the position of the operation device 30A, which is worn by the first player P1, and the position of the operation device 30B, which is worn by the second player P2, in accordance with movement of the operation devices 30A and 30B. When the distance between the position of the operation device 30A and the position of the operation device 30B is so small that the first player P1 and the second player P2 are deemed to be holding hands, the progress manager 11c determines that the second condition is satisfied.

Such a configuration also allows the first user and the second user to cooperate in playing the game by taking advantage of the operation of the two players being detectable. In the above configuration, it is preferable that the following configuration be adopted so that the first player P1 and the second player P2 can easily hold hands with each other while looking at an image displayed on the HMD 20. That is, it is preferable that the distance between the virtual points 100 change as the distance between the HMDs 20 changes so that the ratio of the distance between the players ascertained from the image displayed on the HMDs 20, i.e., the distance between the first virtual point 100A and the second virtual point 100B in the virtual space Vs, to the distance between the HMD 20A and the HMD 20B in the play space Rs is fixed.

[Process after Game Ends]

The game ends, for example, when the player accomplishes a predetermined task to complete the game, when the parameters set for the player are reduced to such values that the game cannot be continued, and when a predetermined time elapses. The process performed for providing the player with the record of participating in the game will hereinafter be described with reference to FIG. 17.

Figure 17:
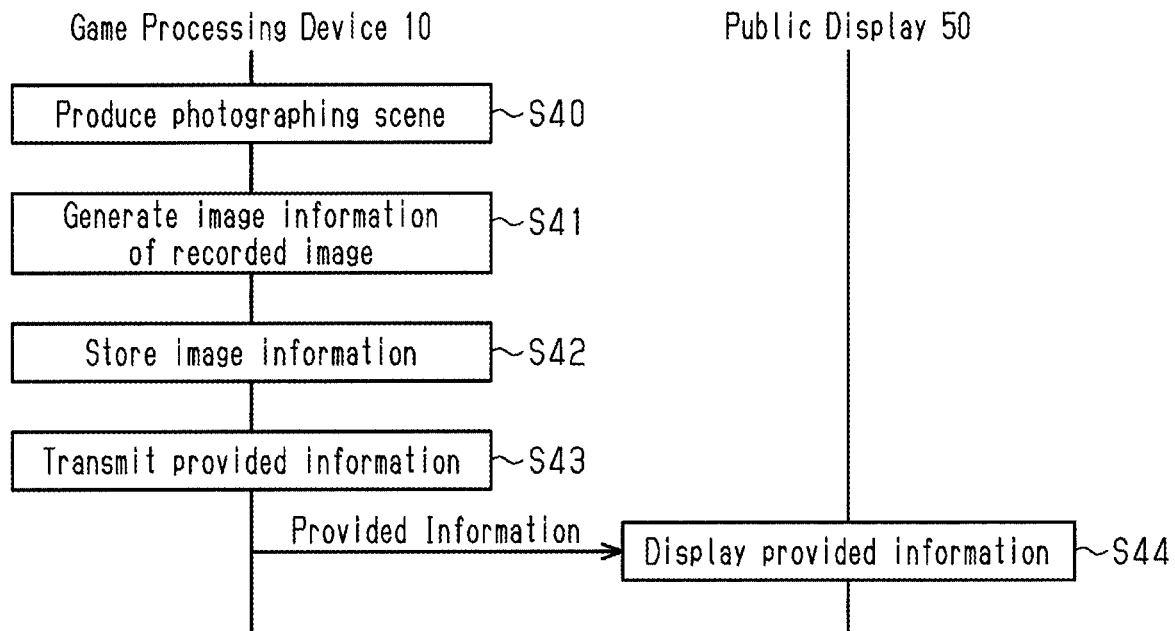
FIG. 17 is a sequence chart illustrating the flow of processes after the game ends in the system of FIG. 1 according to exemplary aspects of the present disclosure.

As shown in FIG. 17, the progress manager 11c of the game processing device 10 updates the position information of the object in the virtual space Vs so as to capture photos of the avatar 250A of the first player and the avatar 250B of the second player in the virtual space Vs (step S40). For example, the progress manager 11c determines the configuration of the virtual space Vs for an object resembling an aircraft such as a drone, equipped with a camera, to fly in the virtual space Vs and perform photographing by releasing the shutter in front of the avatar 250 after a predetermined period of approximately several seconds has elapsed. Using the updated information, the image generator 11b generates and outputs the image information so that the HMD 20 and the public display 50 display the scenes of the photos captured in the virtual space Vs. The player may select the object or icon of the camera arranged in the virtual space Vs to perform shooting.

When shooting is performed in the virtual space Vs, the record of a score or the like obtained by the player when playing the game may be displayed near the camera. Alternatively, a mirror may be arranged near the camera so that the player can view his or her avatar in the mirror, hold a desired pose during photographing, and check the pose.

Subsequently, the image generator 11b of the game processing device 10 refers to the position and orientation of the HMD 20A, the position and orientation of the operation device 30A, the position and orientation of the HMD 20B, and the position and orientation of the operation device 30B when photographing is performed in the virtual space Vs to generate the image information of a recorded image, which is an image of the virtual space Vs according to these positions and orientations (step S41). More specifically, the image generator 11b arranges the avatar 250A and the weapon 260A in accordance with the positions and orientations of the HMD 20A and the operation device 30A and arranges the avatar 250B and the weapon 260B in accordance with the positions and orientations of the HMD 20B and the operation device 30B to generate the image information of the virtual space Vs in which the directions of these avatars 250 are viewed from the position of the camera. The image information of the generated recorded image is included in the player data 12b and stored in the data memory 12 (step S42).

The image generator 11b may change the configuration of the recorded image in accordance with the degree of accomplishment of the game by the player, such as scores obtained by the player. For example, the image generator 11b may form the recorded image as if the avatar 250 looks pleased when the degree of accomplishment is high and may form the recorded image as if the avatar 250 looks sad when the degree of accomplishment is low.

Afterwards, the image generator 11b outputs provided information, which is used to provide the recorded image to an external terminal, to the public display 50 (step S43). Based on the input from the game processing device 10, the public display 50 displays the provided information (step S44).

The provided information is, for example, the URL of a website from which the image information of the recorded image is downloadable. It is preferable that the provided information be represented by, for example, a two-dimensional barcode readable by a mobile terminal such as a smartphone carried by the player. The image information of the recorded image is saved in a web server that establishes the website. The web server may be a device of the game processing device 10 or may differ from the game processing device 10. When the web server differs from the game processing device 10, the image information of the recorded image is transmitted from the game processing device 10 to the web server and stored in the web server in a downloadable manner.

The player can use the recorded image as a record of participation in the game by downloading the image information of the recorded image through the provided information. This makes the player more satisfied with the game and more motivated to participate in the game again. Additionally, for example, if the recorded image is publicized by the player through an SNS or the like, the effect of advertising the game is obtained. This increases the number of users who wish to participate in the game.

Further, in addition to the provided information, the image information of the recorded image may be output from the game processing device 10 to the public display 50 so that the recorded image is displayed on the public display 50. Such a configuration allows a user located around the play space Rs to view the recorded image. Thus, such a user is more motivated to participate in the game.

The device to which the provided information or the image information of the recorded image is output from the game processing device 10 is not limited to the public display 50. The device simply needs to be a terminal that can be used by the player in or near the play space Rs, for example, the assist terminal 60.

[Hardware Configuration]

The hardware configuration of the game processing device 10 of the present embodiment will now be described with reference to FIG. 18.

Figure 18:
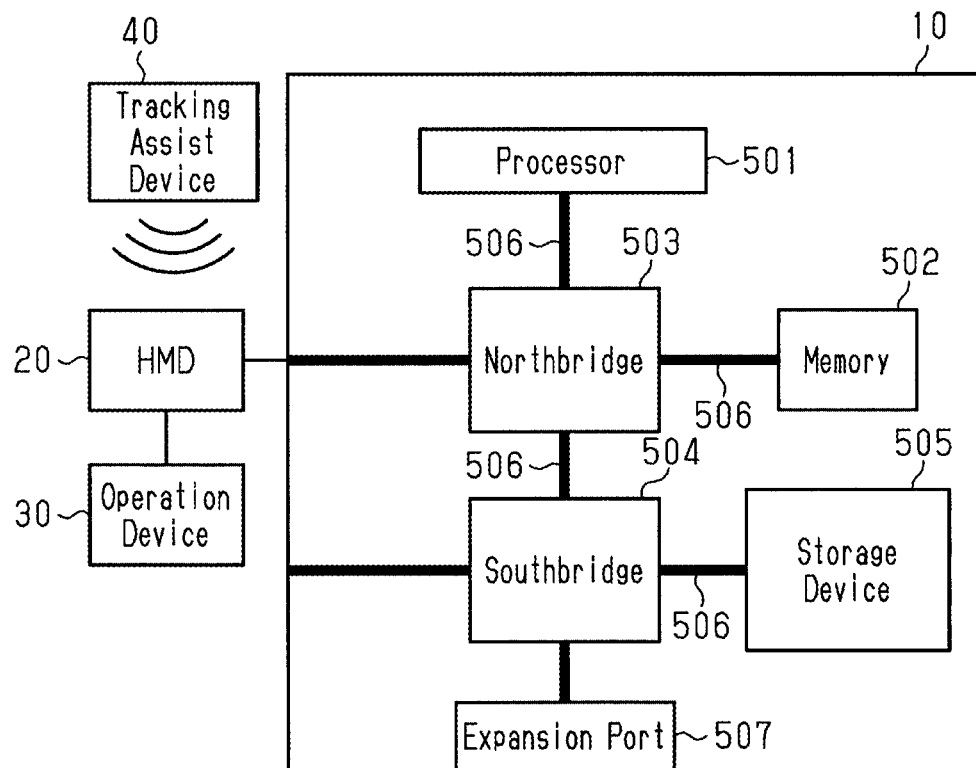
FIG. 18 is a diagram illustrating the hardware configuration of the game processing device of FIG. 1 according to exemplary aspects of the present disclosure.

FIG. 18 shows an example of the game processing device 10. The game processing device 10 is, for example, a desktop personal computer, a laptop, a personal digital assistant (PDA), a server, or other types of computers. The components and the connection relationship of the components shown in FIG. 18 are just exemplary.

The game processing device 10 includes circuitry such as a processor 501 and a memory 502. Further, the game processing device 10 includes circuitry such as a northbridge 503, a southbridge 504, and a storage device 505. The processor 501, the memory 502, and the bridges 503 and 504 are mutually connected by various buses 506 or other such circuits. The processor 501 is in charge of game progress and outputs an image to the HMD 20 and the like, which are connected to the northbridge 503. The game processing device 10 may include multiple processors and multiple memories.

The memory 502 is connected to the northbridge 503 and outputs information related to game processing to the processor 501. For example, the memory 502 is a volatile storage device or a non-volatile storage device. Further, the memory 502 is a storage device or a computer readable medium such as a magnetic or optical disk.

The storage device 505 is connected to the southbridge 504 and outputs information related to game processing to the processor 501. For example, the storage device 505 is, for example, a hard disk device, an optical disk device, a flash memory, or other storage devices.

The northbridge 503 is connected to the HMD 20. The southbridge 504 is connected to an expansion port 507. The expansion port 507 may include various types of communication ports (for example, USB, Bluetooth (registered trademark), Ethernet (registered trademark), and wireless Ethernet) and may be connected to an input/output device such as a keyboard, mouse, and network device.

In the above configuration, the processor 501, the memory 502, and the northbridge 503 correspond to the game controller 11, and the memory 502 and the storage device 505 correspond to the data memory 12.

As described above, the present embodiment has the following advantages.

(1) The condition of producing the special effects in the game includes a condition in which the distance between the first position, which moves in the virtual space Vs in accordance with the position of the first player, and the second position, which moves in the virtual space Vs in accordance with the position of the second player, is within the predetermined range. Thus, the first player and the second player can produce the special effects, which may be a purpose of each player in the game, by cooperating with each other so as to satisfy the condition in which the distance between the first position and the second position is within the predetermined range. This allows multiple players to cooperate in playing the game.

In particular, the operation for setting the distance between the first position and the second position to be within the predetermined range is the operation for changing the distance between the first position and the second position in the real space. This deepens the correlation between the cooperation of the two players in the virtual space Vs and the mutual operation relationship of the two players in the play space Rs during the cooperation. This allows for gameplay taking advantage of the operation of the two players being detectable and thus increases the originality of the game.

(2) When the position of the first player and the position of the second player are determined based on the information detected with the HMDs 20, the distance between the first position and the second position in the virtual space Vs changes depending on the positions of the heads of the first player and the second player. Thus, as compared to when the first position and the second position move with reference to the positions of the hands of the players, the first player and the second player are required to move to a large extent including the torso parts in order to satisfy the conditions of producing the special effects. This increases the reality for the players to cooperate in playing the game.

When the position of the first player and the position of the second player are determined based on the information detected with the operation devices 30, the distance between the first position and the second position in the virtual space Vs changes depending on the positions of the hands of the first player and the second player. Thus, as compared to when the first position and the second position move with reference to the positions of the heads of the players, the first player and the second player are required to move to a small extent in order to satisfy the conditions of producing the special effects. This reduces the movement ranges of the players and also reduces the size required for the play space Rs where the players perform operation.

(3) The HMDs 20 display the range indicators 280, which allow for determination of whether or not the distance between the first position and the second position is within a predetermined range. This allows the players to ascertain whether or not the distance between the first position and the second position is within the predetermined range. Thus, the convenience for the players improves when cooperating to play the game in order to satisfy the conditions of producing the special effects.

(4) When an object encircling the first position and an object encircling the second position are displayed on the HMD 20 as the range indicators 280, the players can intuitively ascertain whether or not the distance between the first position and the second position is within the predetermined range.

(5) When the conditions for producing the special effects include a condition in which a predetermined operation is detected with at least one of the operation device 30A and the operation device 30B, the player easily controls the timing of producing the special effects. This allows the players to easily adjust the timing of producing the special effects as the game progresses and thus increases the convenience for the players.

(6) When the conditions for producing the special effects include a condition in which at least one of the first player and the second player has accomplished a predetermined task in the game, the burden on the players required to produce the special effects is increased. Thus, the production of the special effects is highly worthwhile. This increases the motivation for the players to play the came as a purpose of producing the special effects.

(7) In the game implemented in the virtual space Vs, the first player and the second player attack an enemy that appears in the virtual space Vs. If the special effects increase the attack power of the attack, the production of the special effects is highly worthwhile. This increases the motivation for the players to play the game as a purpose of producing the special effects.

(8) The first position is where the virtual point 100A is projected on the horizontal plane, the second position is where the virtual point 100B is projected on the horizontal plane, the initial position of the first position and the initial position of the second position are set to positions set in advance, and the distance between the initial positions differs from the distance between the HMD 20A and the HMD 20B in the real space when the game starts. In this case, the distance between the players in the play space Rs can be differentiated from the distance between the first position and the second position in the virtual space Vs. The length relationship of these distances is set in accordance with the operation required by the players in the game. This prevents the players from unintentionally contacting with each other and moving out of the play space Rs.

(9) The first permission region MsA, in which the first position is permitted to move, and the second permission region MsB, in which the second position is permitted to move, are set such that they are spaced apart from each other and the distance between these regions is less than or equal to the reference distance, which is a condition for producing the special effects. The HMD 20A displays the region indicator 270 indicating the first permission region MsA, and the HMD 20B displays the region indicator 270 indicating the second permission region MsB. Such a configuration allows the players to perceive the movement permission region and guides the players so that the players move within predetermined regions. Since the first permission region MsA and the second permission region MsB are spaced apart from each other, the players are prevented from unintentionally contacting with each other. Further, since the distance between the first permission region MsA and the second permission region MsB is less than or equal to the reference distance, the players can cooperate to play the game to produce the special effects in such regions.

(10) When the first position is located in the first permission region MsA and the first position is located in the region where the distance to the outer edge of the first permission region MsA is less than or equal to a predetermined distance, the HMD 20A displays the region indicator 270. In such a configuration, when the first position is located proximate to the outer edge of the first permission region MsA, i.e., when the player is likely to move out of the movement permission region, the HMD 20A displays the region indicator 270. Thus, the player can be reminded of the position of the player approaching the outer edge of the movement permission region. Further, as compared to the case in which the HMD 20A always displays the region indicator 270, the field of view of the player in the virtual space Vs is prevented from remaining obstructed by the region indicator 270.

(11) When a tubular object encircling the initial position of the first position and extending in the up-down direction in the virtual space Vs is displayed on the HMD 20A as the region indicator 270, the player can intuitively ascertain the first permission region MsA.

[Modifications]

Each of the above embodiments may be modified as described below.

The second effect produced when one or more conditions including the second condition are satisfied is not limited to the effect of advantageously performing the attack on the target object 210 and simply needs to be a special effect produced in the game. In other words, the special effect does not have to be produced in association with an attack and simply needs to be produced when one or more conditions including the second condition are satisfied. The special effect may be an effect for advantageously progressing the game from a perspective different from the attack on an enemy, for example, recovery of the health value of the player or an effect for increasing the rendering effect in the game by changing, for example, the type or color of the object located in the virtual space Vs and sounds produced from the HMD 20 or the like. In short, when one or more conditions including a condition in which the distance between the first position and the second position is within the predetermined range are satisfied, the game processing device 10 simply needs to produce the special effect in the game.

Further, the special effect does not have to be visually reflected on the configuration of the virtual space Vs, i.e., does not have to be reflected on the image displayed on the HMD 20. In this case, the special effect may be produced by generating sounds from a sound output of the HMD 20 or vibration produced by rotation of a vibration motor of the operation device 30, by changing various parameters stored in the data memory 12 of the game processing device 10, and the like.

When at least one of the simultaneous attack and the combination attack can be performed, multiple players can cooperate to play the game. The various preliminary settings, the setting of the game contents that are not related to the simultaneous attack or the combination attack, and the process after the game ends, which are described in the above embodiment, may be omitted. For example, the configuration related to the avatar 250, i.e., the generation of the face part of the avatar 250 using the face image of the player and the capturing of a photo of the avatar 250, is not required from the perspective of allowing multiple players to cooperate in playing the game.

In the above disclosure, the game system implements the game in which the player shoots the target object 210. Instead, the game implemented by the game system may be applied to other games such as an exploration game, a card game, a racing game, a fighting game, a simulation game, and a roll-playing game. The special effects, which are produced when one or more conditions including the condition in which the distance between the first position and the second position is within the predetermined range are satisfied, simply need to be set in accordance with the contents of the game and, as described above, simply need to be an effect for advantageously progressing the game, an effect for increasing the rendering effect in the game, and the like.

In the above disclosure, the first player and the second player are actual players. Instead, any one of the first player and the second player may be set as a character that is not operated by an actual player, i.e., a non-player character (NPC).

The HMD 20 serving as the mounted display may include a housing that incorporates the information processor 21, the tracking information detector 22, and the display 23. Alternatively, a multi-functional mobile terminal such as a smartphone may be accommodated in a dedicated housing in a removable manner and used as the mounted display. That is, the multi-functional mobile terminal may have the functions of the information processor 21 and the display 23. The multi-functional mobile terminal may have the function of the tracking information detector 22. Instead, various sensors arranged in the housing may have the function of the tracking information detector 22. The multi-functional mobile terminal communicates with the game processing device 10 in a wired or wireless manner.

In the above disclosure, the HMD 20 displays, on the display 23, an image in which the influence of parallax or the like is taken into account. Instead, the display 23 may be formed by a single display panel and may display an image in which the influence of parallax or the like is not taken into account.

In the above disclosure, the game system implements the game played by the first player wearing the HMD 20 and the second player wearing the HMD 20 in cooperation. Instead, the game system may implement a game played in cooperation by the first player wearing the HMD 20 and the second player using an installed-type game dedicated device, i.e., a console game. The second player views the image of the virtual space displayed on the display connected to the game dedicated device. In this case, the second player changes the second position by operating an operation portion (switch, lever, button, or the like) arranged on the game dedicated device. In the same manner as the above embodiment, the first position changes when the first player moves the HMD 20A or the operation device 30A. When the distance between the first position and the second position is within the predetermined range, for example, the special effect can be produced. As another option, the game system may implement a game played in cooperation by the first player wearing the HMD 20 and the second player using a multi-functional mobile terminal such as a smartphone. The second player views the image of the virtual space displayed on the display of the multi-functional mobile terminal. In this case, the second position changes when the second player operates a touch panel or the like. In the same manner as the above embodiment, the first position changes when the first player moves the HMD 20A or the operation device 30A. When the distance between the first position and the second position is within the predetermined range, for example, the special effect can be produced.

In the above disclosure, when the distance between the first position and the second position is within the predetermined range, the effect of advantageously performing an attack in the game can be produced. Instead, when the distance between the first position and the second position is within the predetermined range, the first player and the second player may be able to communicate with each other. For example, the first player and the second player may be able to have a conversation in the virtual space. Alternatively, when the distance between the first position and the second position is within the predetermined range, the parameters associated with at least one of the first player and the second player may be changed. For example, the favorability rating for the second player and the defense ability may be increased.

In the above disclosure, when the distance between the first position and the second position is within the predetermined range, the special effect can be produced in the game. Instead of or in addition to this, when the distance between the first position and the second position is within the predetermined range, the execution of a predetermined activity in the game may be prohibited or limited. For example, when the distance between the first position and the second position is within the predetermined range, the action performed based on the operation of moving the operation device 30 by the player may be restricted from being performed. This guides the players not to execute the operation of moving the operation device 30 and thus prevents the players from contacting with each other when the distance between the players is close. Further, the special effect may be produced when the distance between the first position and the second position is within a first predetermined range, and a predetermined action may be prohibited when the distance between the first position and the second position is within a second predetermined range, which is smaller than a first predetermined range. Alternatively, when the distance between the first position and the second position is within the predetermined range, the functions in the game may be activated or deactivated. The functions in the game may be associated with the players or associated with predetermined objects in the virtual space Vs.

In the above disclosure, the game system implements the game played in cooperation by the first player wearing the HMD 20 and the second player wearing the HMD 20. Instead, the game system may implement a game using a multi-functional mobile terminal for the game to progress by touching the screen or operating an operation portion such as a button. In this case, the positions of the first player and the second player are determined using a position detection sensor incorporated in the multi-functional mobile terminal or using a position detection sensor possessed or accompanied by the user. The position detection sensor may be at least one of a gyro sensor, an acceleration sensor, and a geomagnetic sensor incorporated in the multi-functional mobile terminal or may be a sensor using a global positioning system (GPS) or other satellite positioning systems. Further, when the game is played indoors, a tracking assist device 40 arranged indoors may be used. The image of the virtual space Vs is output to the display of the multi-functional mobile terminal. In addition, the action for the object in the virtual space Vs is executed by operating an operating portion such as a touch panel display or a switch of the multi-functional mobile terminal. The first position in the virtual space Vs moves in accordance with the position of the multi-functional mobile terminal of the first player, and the second position in the virtual space Vs moves in accordance with the position of the multi-functional mobile terminal of the second player. When the distance between the first position and the second position in the virtual space Vs is within the predetermined range, the special effect is produced. In such type of a game, a multi-play game played by multiple players in cooperation already exists. However, when the relative positional relationship in the real world of the players can be used, the originality of the game increases as compared to the conventional multi-play game. In the configuration in which the special effect and the like are produced when the distance between the position of the first player and the position of the second player is within the predetermined range, the game processing program, the game processing method, and the game processing device that allow multiple players to cooperate to play the game based on the relative positional relationship of the players can be provided.

In the above disclosure, the position and orientation of the operation device 30 is detected through the tracking information detector 32. Alternatively or additionally, the tracking information detector 32 may be worn on the hand or arm of the player, and the position of the hand or arm of the player may be directly detected by the tracking information detector 32.

The tracking information detector 32 may perform a process to detect the position of the tracking information detector 32 by cooperating with the tracking assist device 40.

In the above disclosure, the system for detecting the position of the HMD 20 comprises the HMD 20 and a sensor external to the HMD 20. The HMD 20 and the external sensor cooperate with each other to detect the position of the HMD 20. Alternatively or additionally, an "inside-out" system may be used in which a sensor provided on the HMD 20 scans the real space and sends its positions to the game processing device 10. Also, the system may be a stand-alone system in which functionality performed by the game processing device 10 may be provided on the HMD 20. Furthermore, in place of the optical system comprising a light-emitting device and a light-receiving device, a camera system may be used in which the camera identifies the HMD 20 or the camera provided on the HMD 20 detects a predetermined position in the real space. In the same manner, the system for detecting the position of the operation device 30 is not particularly limited, and may be, for example, at least one of an inside-out system and an outside-in system, or a stand-alone system that determines the position of the operation device 30 without cooperating with another device. Also, the system may be at least one of an optical system or a camera system.

The game controller 11 is not limited to one that performs software processing on all processes executed by itself. For example, the game controller 11 may be equipped with a dedicated hardware circuit (e.g., application specific integrated circuit: ASIC) that performs hardware processing on at least some of the processes to be executed by itself. That is, the game controller 11 may be configured as circuitry including 1) one or more processors that operate in accordance with a computer program (software), 2) one or more dedicated hardware circuits that execute at least some of the various processes, or 3) combinations thereof. The processor includes a CPU and memories such as a RAM and a ROM, and the memory stores program codes or instructions configured to cause the CPU to execute the processing. The memories, that is, computer readable media, include any type of media that are accessible by general-purpose computers and dedicated computers.

To the extent that the above descriptions may be considered to be organized into separate embodiments, such organization is merely for ease in understanding the inventive concepts described herein. However, the features described herein are combinable across the embodiments without limitation as one of ordinary skill would recognize.

The technical ideas derived from the above embodiment and the modifications include the following supplements.

Supplement 1

A game processing program for a computer, the computer causing a virtual space where a game is performed to be displayed on a first terminal used by a first player and a second terminal used by a second player, the program causing the computer to:

move a first position in the virtual space in accordance with a position of the first player based on an output of a sensor that determines the position of the first player;

move a second position in the virtual space based on operation of the second player; and include, in a condition for producing a special effect in the game, a condition in which a distance between the first position and the second position is within a predetermined range.

Supplement 2

A game processing program for a computer, the computer causing a virtual space where a game is performed to be displayed on a first terminal used by a first player and a second terminal used by a second player, the program causing the computer to:

move a first position in the virtual space in accordance with a position of the first player based on an output of a sensor that determines the position of the first player;

move a second position in the virtual space in accordance with a position of the second player based on an output of a sensor that determines the position of the second player; and include, in a condition for producing a special effect in the game, a condition in which a distance between the first position and the second position is within a predetermined range

The invention claimed is:

1. A non-transitory computer-readable medium that stores computer-readable instructions for processing a game, the computer-readable instructions, when executed by circuitry, causes the circuitry to perform a method comprising:

controlling a first mounted display worn by a first player to display a virtual space in association with a first virtual position in the virtual space;

setting an initial position of the first virtual position to a position set in advance;

setting a first movement permission region in which the first virtual position is permitted to move as the first player moves;

determining a position of the first player in the real space based on an output of a first sensor;

moving the first virtual position in accordance with the position of the first player;

determining whether a first distance from the first virtual position to an outer edge of the first movement permission region is less than or equal to a predetermined distance; and responsive to determining that the first distance is less than or equal to the predetermined distance, controlling the first mounted display to display a first region indicator that indicates the first movement permission region.

2. The non-transitory computer-readable medium according to claim 1, wherein the computer-readable instructions, when executed by the circuitry, cause the circuitry to further perform a method comprising:

determining the position of the first player based on information detected with the first mounted display.

3. The non-transitory computer-readable medium according to claim 1, wherein the computer-readable instructions, when executed by the circuitry, cause the circuitry to further perform a method comprising:

determining the position of the first player based on information detected with a first operation device, which is operated by the first player.

4. The non-transitory computer-readable medium according to claim 1, wherein the computer-readable instructions, when executed by the circuitry, cause the circuitry to further perform a method comprising:

controlling the first mounted display to display a second indicator that allows for determination of whether or not the distance between the first virtual position and a second virtual position is within a predetermined range.

5. The non-transitory computer-readable medium according to claim 4, wherein the second indicator includes an object encircling the first virtual position of the virtual space, which is displayed on the first mounted display.

6. The non-transitory computer-readable medium according to claim 1, wherein the computer-readable instructions, when executed by the circuitry, cause the circuitry to further perform a method comprising:

producing a special effect in the game in response to detecting a predetermined operation in a first operation device, which is operated by the first player, when the distance between the first virtual position and a second virtual position is within a predetermined range.

7. The non-transitory computer-readable medium according to claim 1, wherein the computer-readable instructions, when executed by the circuitry, cause the circuitry to further perform a method comprising:

producing a special effect in the game in response to the distance between the first virtual position and a second virtual position being within a predetermined range and the first player having accomplished a predetermined task in the game.

8. The non-transitory computer-readable medium according to claim 7, wherein the game is a game in which the first player and a second player attack an object located in the virtual space, the second virtual position is moved in accordance with the position of the second player, and the special effect is an effect for increasing an attack power of the attack.

9. The non-transitory computer-readable medium according to claim 1, wherein the computer-readable instructions, when executed by the circuitry, cause the circuitry to further perform a method comprising:

controlling the first mounted display not to display the first indicator in response to determining that the first distance is not less than nor equal to the predetermined distance.

10. The non-transitory computer-readable medium according to claim 1, wherein the first indicator includes a tubular object displayed on the first mounted display, and the object encircles the first virtual position and extends in a vertical direction of the virtual space.

11. The non-transitory computer-readable medium according to claim 10, wherein the tubular object has a mesh-pattern circumferential wall.

12. The non-transitory computer-readable medium according to claim 10, wherein the tubular object has a semitransparent circumferential wall.

13. A method for processing a game, comprising:

controlling, by circuitry, a first mounted display worn by a first player to display a virtual space in association with a first virtual position in the virtual space;

setting, by the circuitry, an initial position of the first virtual position to a position set in advance;

setting, by the circuitry, a first movement permission region in which the first virtual position is permitted to move as the first player moves;

determining, by the circuitry, a position of the first player in the real space based on an output of a first sensor;

moving, by the circuitry, the first virtual position in accordance with the position of the first player;

determining, by the circuitry, whether a first distance from the first virtual position to an outer edge of the first movement permission region is less than or equal to a predetermined distance; and responsive to determining that the first distance is less than or equal to the predetermined distance, controlling, by the circuitry, the first mounted display to display a first region indicator that indicates the first movement permission region.

14. A device for processing a game, comprising:

circuitry configured to:

control a first mounted display worn by a first player to display a virtual space in association with a first virtual position in the virtual space;

set an initial position of the first virtual position to a position set in advance;

set a first movement permission region in which the first virtual position is permitted to move as the first player moves;

determine a position of the first player in the real space based on an output of a first sensor;

move the first virtual position in accordance with the position of the first player;

determine whether a first distance from the first virtual position to an outer edge of the first movement permission region is less than or equal to a predetermined distance; and responsive to determining that the first distance is less than or equal to the predetermined distance, control the first mounted display to display a first region indicator that indicates the first movement permission region.

* * * * *